(12) United States Patent
Kim et al.

(10) Patent No.: US 9,980,158 B2
(45) Date of Patent: May 22, 2018

(54) METHOD AND DEVICE FOR BASE STATION SELF-CONFIGURATION IN DISTRIBUTION NETWORK STRUCTURE

(71) Applicant: Samsung Electronics Co., Ltd., Suwon-si, Gyeonggi-do (KR)

(72) Inventors: Sangjin Kim, Suwon-si (KR); Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 15/030,772

(22) PCT Filed: Oct. 29, 2014

(86) PCT No.: PCT/KR2014/010223
§ 371 (c)(1),
(2) Date: Apr. 20, 2016

(87) PCT Pub. No.: WO2015/065031
PCT Pub. Date: May 7, 2015

(65) Prior Publication Data
US 2016/0255514 A1    Sep. 1, 2016

(30) Foreign Application Priority Data

Oct. 29, 2013  (KR) .......................... 10-2013-0129453

(51) Int. Cl.
*H04W 24/02* (2009.01)
*H04L 29/12* (2006.01)
(Continued)

(52) U.S. Cl.
CPC ......... *H04W 24/02* (2013.01); *H04L 41/0809* (2013.01); *H04L 41/0886* (2013.01);
(Continued)

(58) Field of Classification Search
None
See application file for complete search history.

(56) References Cited

U.S. PATENT DOCUMENTS 6,988,148 B1 * 1/2006 Sheth ................ H04L 29/12283
709/220
7,197,549 B1 * 3/2007 Salama ............. H04L 29/12283
709/223
(Continued)

FOREIGN PATENT DOCUMENTS

EP     1 613 022 A1    1/2006
WO    03/036899 A2    5/2003
(Continued)

*Primary Examiner* — Diane Lo
(74) *Attorney, Agent, or Firm* — Jefferson IP Law, LLP

(57) ABSTRACT

An embodiment of the present invention provides a method for transmitting configuration information by a local administrator and the local administrator transmitting the configuration information, the method comprising the steps of: receiving an internet protocol pool (IP pool) allocated by an IP address management server of an external IP network; receiving an IP address allocation request from a new base station in the distribution network; and, in response to the received IP address allocation request, allocating the base station a certain IP address on the basis of the allocated IP pool. In addition, the embodiment of the present invention provides a base station for receiving configuration information from the local administrator and a self-configuration method for the base station.

18 Claims, 25 Drawing Sheets

(51) Int. Cl.
  *H04L 12/24* (2006.01)
  *H04W 88/08* (2009.01)
(52) U.S. Cl.
  CPC ...... *H04L 61/2015* (2013.01); *H04L 61/2023* (2013.01); *H04L 61/2061* (2013.01); *H04W 88/08* (2013.01)

(56) References Cited

U.S. PATENT DOCUMENTS

| | | | |
|---|---|---|---|
| 7,788,345 B1* | 8/2010 | Sukiman | H04L 29/12283 709/220 |
| 2003/0076805 A1 | 4/2003 | Agrawal et al. | |
| 2005/0018681 A1 | 1/2005 | Koch et al. | |
| 2005/0286518 A1 | 12/2005 | Park et al. | |
| 2011/0185049 A1 | 7/2011 | Atreya et al. | |
| 2013/0067023 A1* | 3/2013 | Joy | H04L 63/1458 709/217 |
| 2013/0142136 A1 | 6/2013 | Pi et al. | |
| 2014/0341109 A1* | 11/2014 | Cartmell | H04L 45/308 370/328 |

FOREIGN PATENT DOCUMENTS

| | | |
|---|---|---|
| WO | 2011/093972 A1 | 8/2011 |
| WO | 2013/058607 A1 | 4/2013 |

\* cited by examiner

METHOD AND DEVICE FOR BASE STATION SELF-CONFIGURATION IN DISTRIBUTION NETWORK STRUCTURE

TECHNICAL FIELD

The present invention relates to a self-configuration method and apparatus of a base station in a distributed network architecture. The present invention provides a self-configuration method and apparatus optimized in the distributed network architecture.

BACKGROUND ART

With the popularization of wireless Internet Communication devices such as smartphones, mobile communication data demand has increased rapidly by an annual average of about 50% to 200%. To meet the rapidly increasing mobile communication data demand, next mobile communication technologies under development are focused on simplification of mobile communication network structure and miniaturization of cells.

The legacy mobile communication network designed in a centralized topology is comprised of terminals, base stations, and a gateway as shown in FIG. 1. The gateway may be categorized into Mobility Management Entity (MME), Serving Gateway (S-GW), and Packet Data Network Gateway (PDN-GW). The MME manages mobility of terminals, the S-GW processes traffic of the terminal, and the PDN GW relays the traffic of the terminal between an external network and an internal network.

In the centralized network structure, all the traffic transmitted by the terminal is delivered to the external network via the PDN GW; thus, as the number of the terminals connected to the network increases, the traffic load that the PDN GW has to process increases, resulting in packet processing delay problems. If the PDN GW malfunctions or breaks down and fails to provide the service, this is likely to put at risk the whole service of the sub-network.

Also, when it is necessary for the neighboring base stations connected to the S-GW to communicate data, the traffic has to pass the PDN GW to arrive at the neighboring base station and there will be a failure to optimize the traffic path, resulting in packet transmission delay.

Therefore there is a need of research on next generation communication technology that is capable of solving the problems of the centralized network.

DISCLOSURE OF INVENTION

Technical Problem

The present invention aims provide an improved self-configuration method of a base station.

An embodiment of the present invention proposes an optimized base station IP address allocation method and initial configuration data acquisition method optimized to a distributed network structure.

Solution to Problem

In accordance with an aspect of the present invention, a configuration information transmission method in distributed network architecture includes receiving allocation of Internet Protocol (IP) Pool from an IP address management server of an external IP network, receiving an IP address allocation request from a new base station (BS) in the distributed network, and allocating an IP address to the BS in response to the IP address allocation request, the IP address being selected in the allocated IP Pool.

In accordance with another aspect of the present invention, a local manager of distributed network architecture includes a communication unit which performs data communication and a control unit which controls receiving allocation of IP Pool from an IP address management server of an external IP network, receiving an IP address allocation request from a new base station in the distributed network, and allocating an IP address to the BS in response to the IP address allocation request, the IP address being selected in the allocated IP Pool.

In accordance with another aspect of the present invention, a self-configuration method of a base station includes transmitting a backhaul configuration request message including IP address allocation request information and receiving a backhaul configuration response message including an IP address and local manager information in response to the backhaul configuration request message, the local manager storing an IP Pool allocated by an IP address management server of an external IP network.

In accordance with still another embodiment of the present invention, a base station of a distributed network includes a communication unit which performs data communication and a control unit which controls transmitting a backhaul configuration request message including IP address allocation request information and receiving a backhaul configuration response message including an IP address and local manager information, wherein the local manager stores an IP Pool allocated by an IP address management server of an external IP network.

Advantageous Effects of Invention

An embodiment of the present invention provides a method and apparatus for operating a distributed network efficiently.

Also, an embodiment of the present invention proposes a network simplified so as to improve the system efficiency. With such a network, it is possible to reduce the service discontinuation probability caused by malfunctioning or breakdown of a certain device and packet transmission delay by allowing communication between neighboring base stations.

Also, a base station according to an embodiment of the present invention is capable of managing a base station IP Pool in a hierarchical and distributive manner to minimize waste of public IP addresses and to acquire IP addresses quickly during its self-configuration phase.

Also, a base station according to an embodiment of the present invention is capable of allocating IP addresses efficiently in the initial IP Pool based on the relevant information and of allocating or withdrawing the IP Pool efficiently during the operation of a network.

Also, a base station according to an embodiment of the present invention is capable of managing IP addresses based on the operation state (idle or active state) and load status of the base station.

Also, an embodiment of the present invention is capable of providing a method for allocating initial configuration data quickly during the self-configuration phase and reducing load of the core network.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. This aims to omit unnecessary description so as to make the subject matter of the present invention clear.

Figure 1:
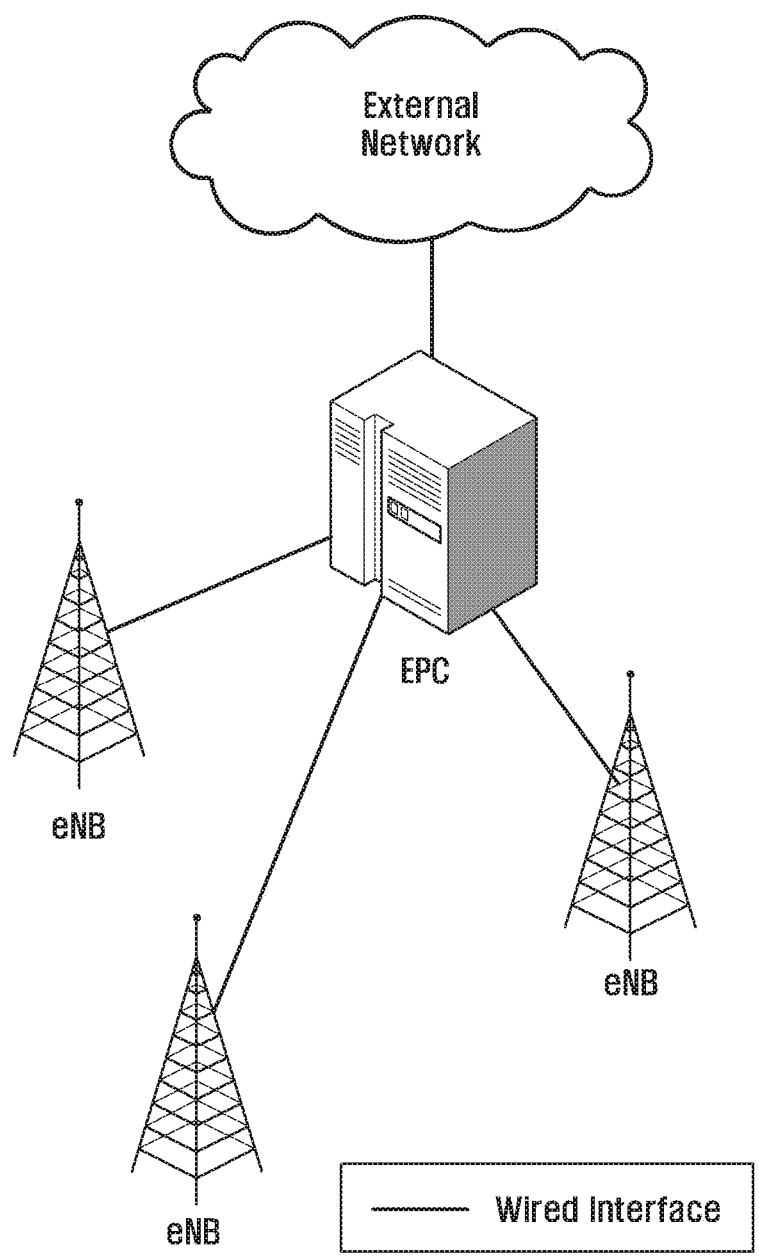
FIG. 1 is a diagram illustrating the conventional centralized network architecture.
Figure 2:
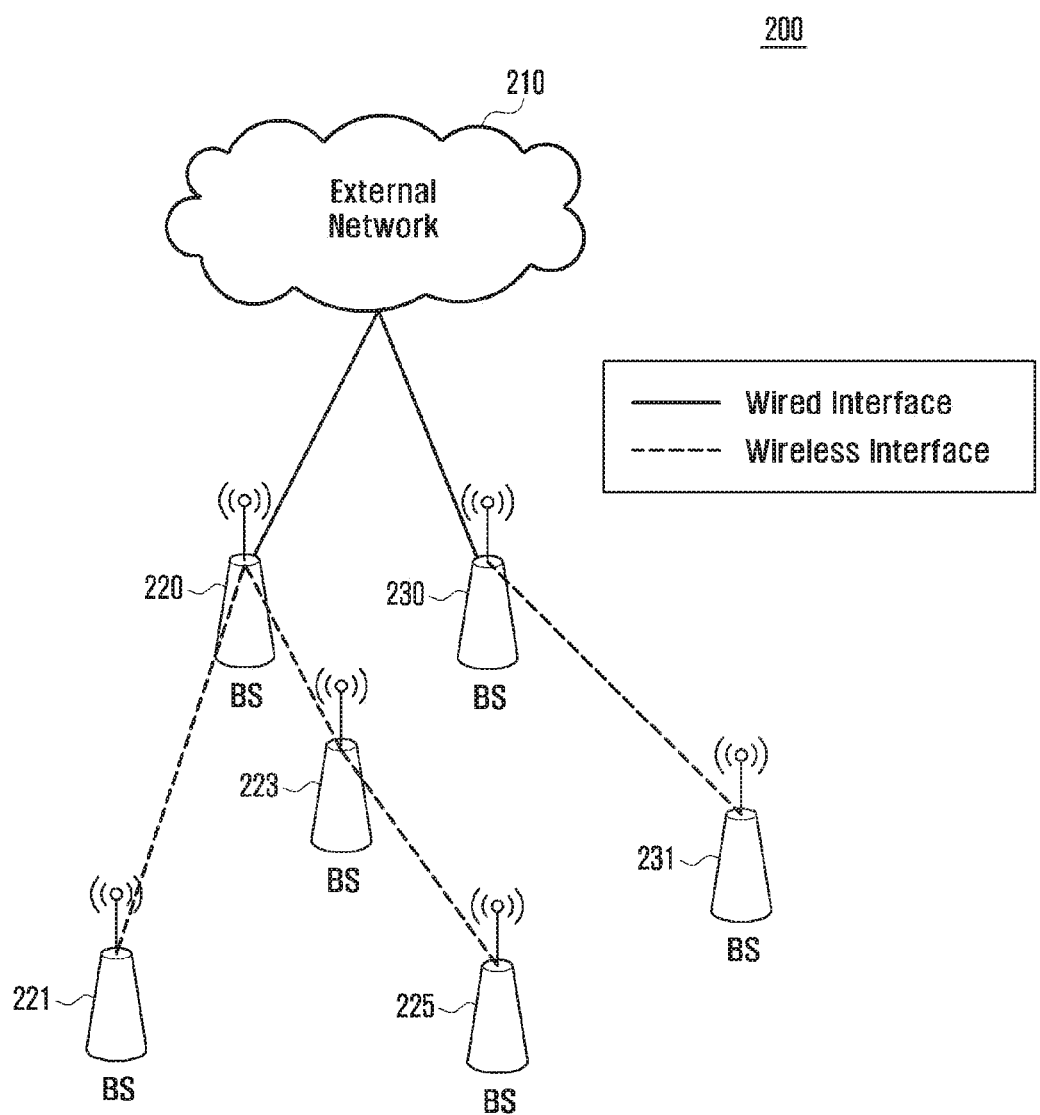
FIG. 2 is a conceptual diagram illustrating a distributed network structure according to an embodiment of the present invention.

FIG. 2 is a conceptual diagram illustrating a distributed network structure according to an embodiment of the present invention.

Referring to FIG. 2, the distributed network architecture may include an external network 210 and base stations (BSs) 220, 230, 221, 223, 225, and 231). In the case of using the distributed network proposed in FIG. 2, it may be possible to mitigate the problems of the legacy centralized network. In the distributed network architecture 200, a BS may include all functions of a gateway and may connect to an external network 210 (e.g., Internet). The neighboring BSs may connect to each other through a wired or wireless interface for communication. Although the BSs are connected to each other through a wireless interface in FIG. 2, it may also possible for the distributed BSs to connect to each other through a wired interface.

Such distributed network architecture is capable of mitigating the problem of traffic load concentration to a specific network entity and reducing the probability of service discontinuation caused by malfunction or breakdown of a certain device.

Figure 3:
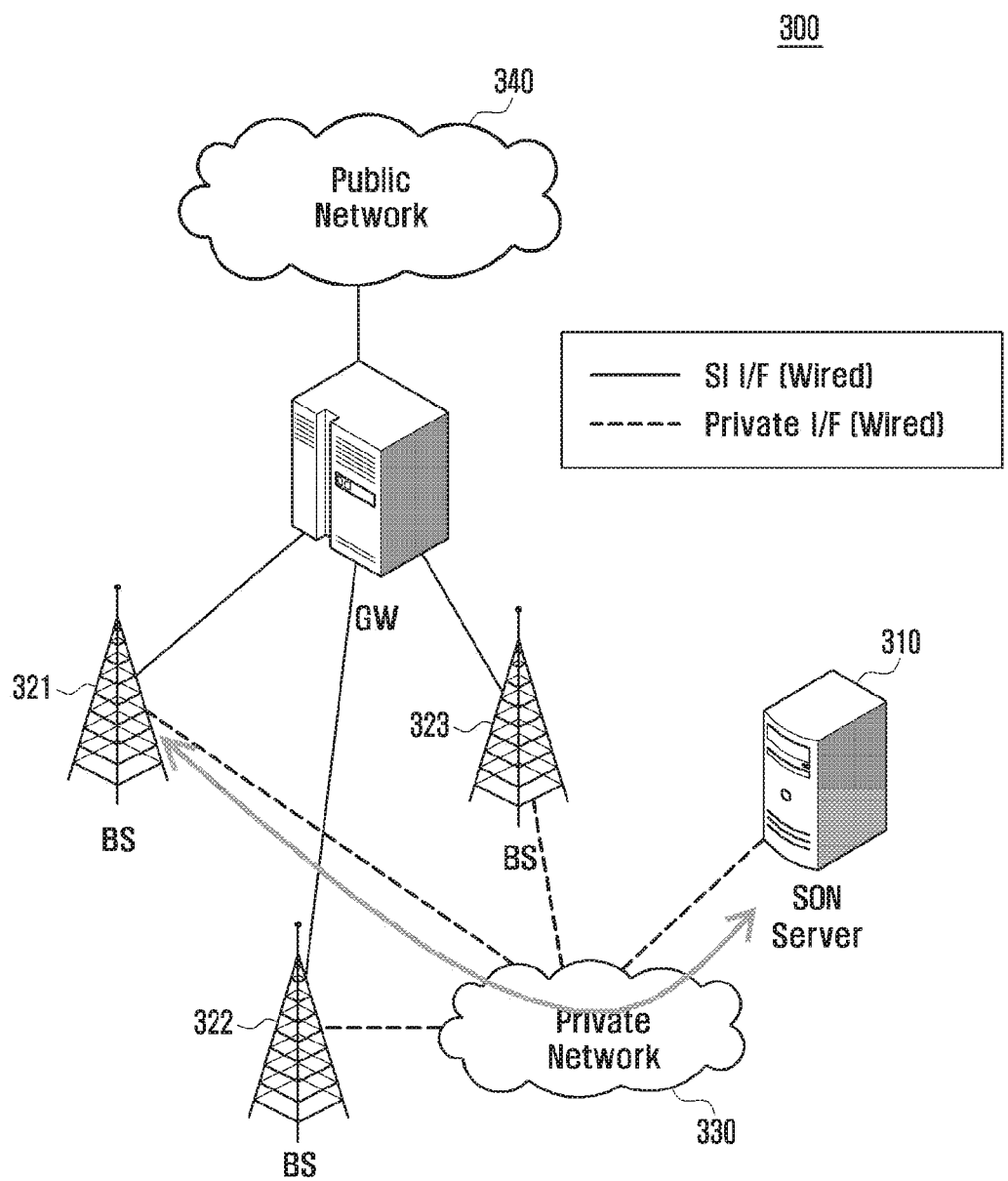
FIG. 3 is a conceptual diagram illustrating a SON technology-enabled centralized network.
Figure 4:
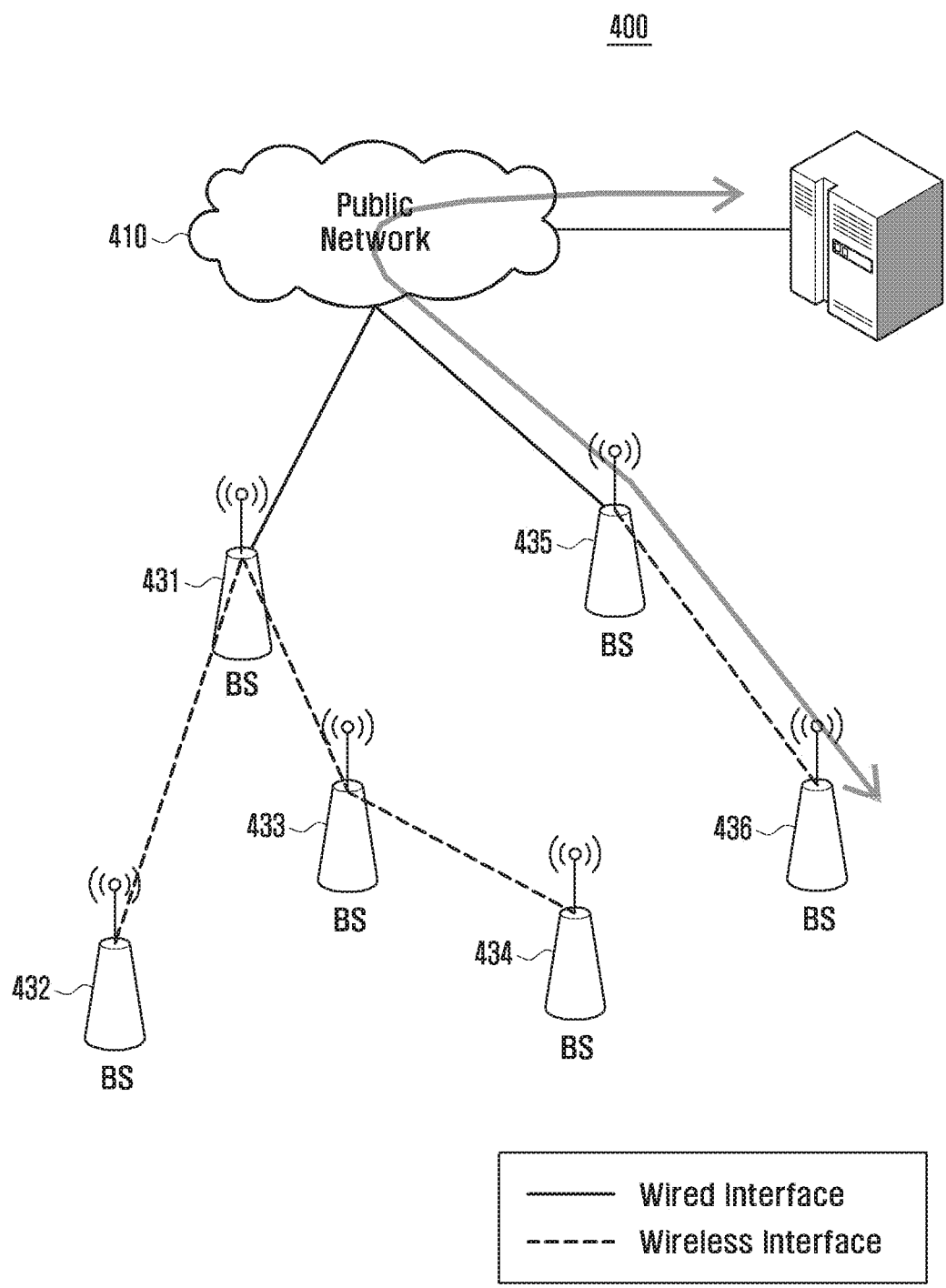
FIG. 4 is a conceptual diagram illustrating a SON technology-enabled distributed network according to an embodiment of the present invention.

A description is made hereinafter of the Self-Organizing Network (SON) technology-enabled network with reference to FIGS. 3 and 4. FIG. 3 is a conceptual diagram illustrating a SON technology-enabled centralized network. FIG. 4 is a conceptual diagram illustrating a SON technology-enabled distributed network according to an embodiment of the present invention.

An embodiment of the present invention proposes a technique for improving efficiency in a next generation mobile communication technology. For example, it may be possible to propose a network using small cells. In the next generation mobile communication system, it may be considered to deploy small BSs to form a plurality of small cells (radius: a few hundred meters) to improve spectral efficiency per unit area in comparison with a legacy macro cell (radius: a few km). The number of small cell BSs may increase exponentially when migrating from the macro cell to plural small cells.

As described above, with the increase of the network size and the number of network entities in the next generation mobile communication system, the SON is gaining attention as a technology to reduce network management costs. The SON technology consists of a SON server and a SON client. The SON server is capable of handling the problems occurring in the network and SON clients autonomously according a predetermined SON algorithm without involvement of the operator. The SON client is a network entity with the SON function and usually a BS.

SON is capable of reducing the network management costs through three main technologies. First, self-configuration is a technology for performing basic configuration and radio environment configuration autonomously after the BS turns on. Self-configuration includes BS IP address configuration, BS authentication, and BS software and settings data configuration. Second, self-optimization is a technology for updating a neighboring BS list and optimizing cell coverage and capacity autonomously. Third, self-healing is a technology for detecting a malfunction of the BS and recovering the malfunctioning function autonomously.

A description is made hereinafter of the SON-enabled centralized network with reference to FIG. 3. An example of the centralized network is a 4$^{th}$ generation mobile communication system. In order to support the SON technology, the SON server 310 and SON clients 321, 322, and 323 (BSs) in the 4$^{th}$ generation mobile communication system connect to an internal IP network (Private Network) 330 directly through wired interfaces (e.g., UPT cable and fiber optic) to exchange information as shown in FIG. 3.

In the next generation mobile communication system, based on the distributed network architecture, the number of BSs increases to form a plurality of small cells and this may make it difficult to connect the BSs and SON server directly through the wired interfaces such as the centralized network of FIG. 3 because of technical difficulties and cost problems. There is therefore a need of a SON technology for managing the distributed network efficiently.

In the small cell environment of the distributed network architecture, the BSs connect to the SON server 420 through an external IP network (public network) 410 as shown in FIG. 4. In the distributed network architecture 400, it may be difficult for all BSs to have wired backhauls because of the cost and technical problems as described above. Accordingly, some BSs 431 and 435 connect to the SON server 420 through wired backhauls while other BSs 432, 433, 434, and 436 connect to the BSs 431 and 435 having the wired backhauls through wireless backhauls to communicate with the SON server 420. Although FIG. 4 shows an exemplary network architecture, the network architecture proposed in the present invention is not limited thereto but can be designed such that some BSs communicate with the SON server 420 through multiple-hop wired/wireless backhaul.

In comparison with the centralized network system of FIG. 3 (e.g., 4$^{th}$ generation mobile communication system), it takes a relatively long time to perform communication between the BS and the SON server in the next generation mobile communication of FIG. 4, resulting in an increase of the time for completing self-configuration procedure and network load. Accordingly, the BS self-configuration technology suitable for the distributed network architecture of the next generation mobile communication system environment according to an embodiment of the present invention becomes more and more important. According to an embodiment of the present invention, its effect is likely to be superior in the small cell environment.

A description is made hereinafter of the self-configuration technology and procedure of a BS with reference to FIGS. 5 and 6.

Figure 5:
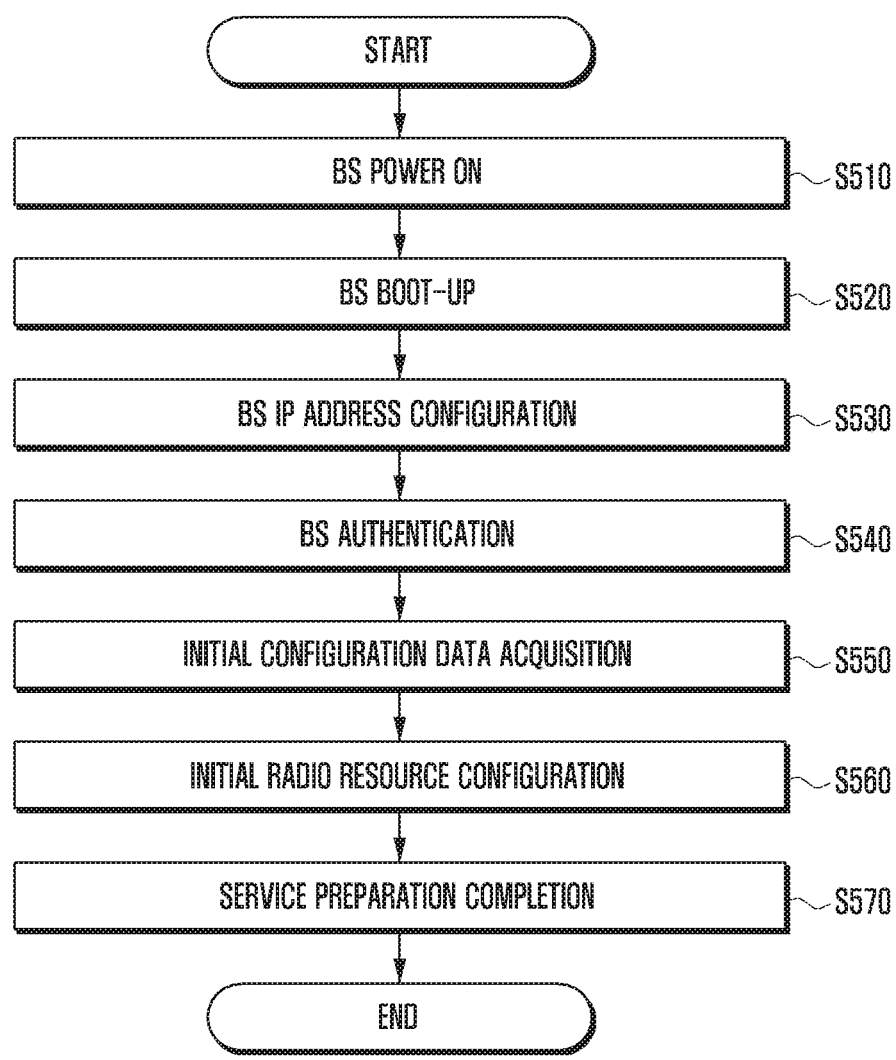
FIG. 5 is a flowchart illustrating a self-configuration procedure in the centralized network architecture.
Figure 6:
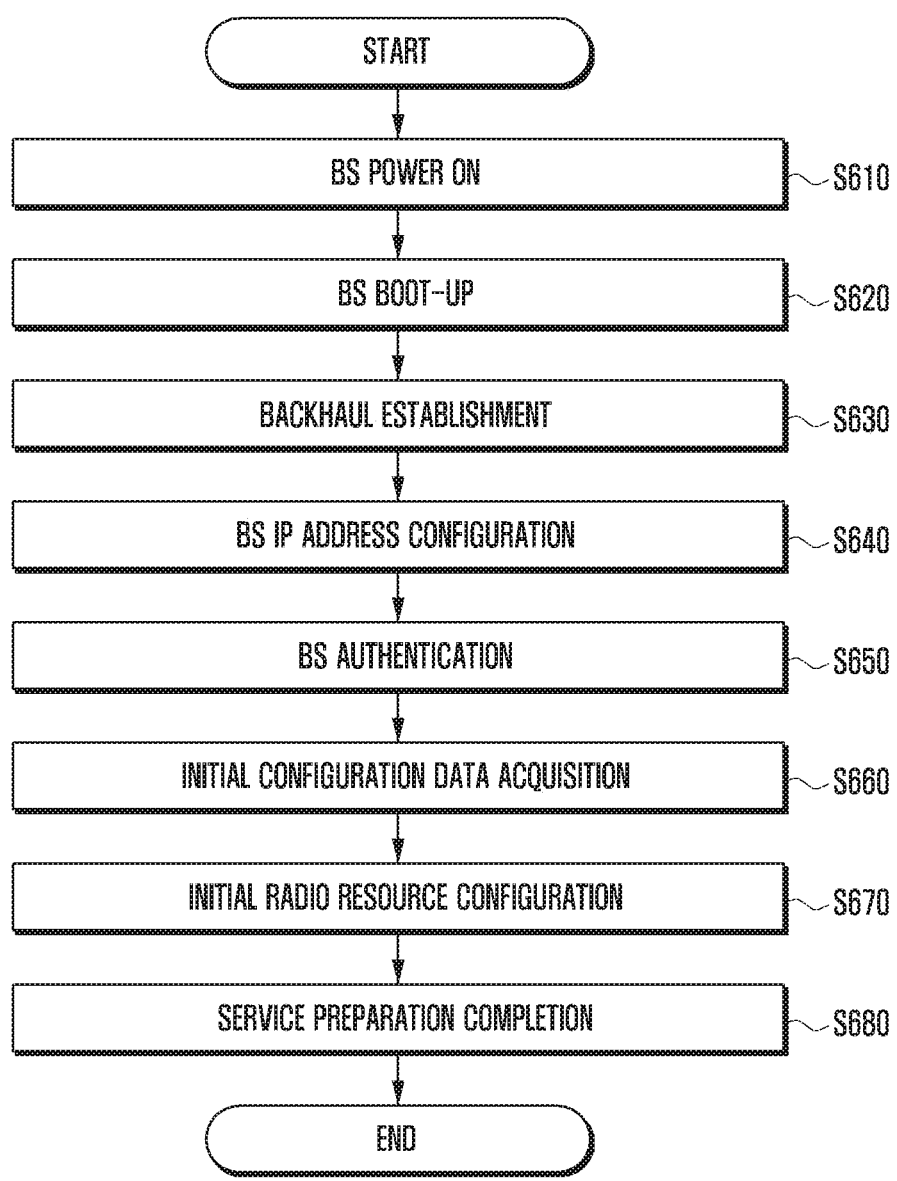
FIG. 6 is a flowchart illustrating a self-configuration procedure in the distributed network architecture.

FIG. 5 is a flowchart illustrating a self-configuration procedure in the centralized network architecture, and FIG. 6 is a flowchart illustrating a self-configuration procedure in the distributed network architecture.

The BS self-configuration technology denotes all processes and functions that are performed until the BS that is just turned on is ready to allow a terminal to connect. Typically, the self-configuration includes BS ID configuration, BS authentication, BS initial configuration information acquisition (e.g. software, firmware, and configuration data), and BS initial parameter configuration functions.

Referring to FIG. 5, the BS self-configuration procedure starts at step S510 when the BS powers on in the centralized network architecture. If it powers on, the BS performs a booting process based on the information stored in the firmware at step S520 and is allocated a BS IP address for IP communication with a SON server at step S530. It may be possible to use static IP address allocation or dynamic IP address allocation to allocate an IP address to the BS. The static IP address allocation is a method for the operator use an IP address preconfigured to the BS, and the dynamic IP address allocation is a method for a server to allocate a new IP address to the BS using a Bootstrap Protocol or Dynamic Host Configuration Protocol.

In the centralized network architecture, the BS is connected to the SON server directly through an internal network and allocated a Private IP address such that the IP address exhaustion probability is low.

If an IP address is allocated, the BS performs an authentication process with the SON server at step S540 and, if authentication is successful, downloads initial configuration data for normal BS operations from the SON server at step S550. The BS initial configuration data may be sorted into common data and BS-specific data. The common data includes software and firmware of large volume of about a few hundred megabytes (MB). The BS-specific data includes configuration data and authentication data of small volume of about a few megabytes.

Finally, the BS performs the initial radio resource configuration based on the initial configuration data at step S560 and completes the self-configuration function so as to enter the state in which a terminal can connect to the BS at step S570.

FIG. 6 is a flowchart illustrating a BS self-configuration procedure in the case of reusing the self-configuration method designed for a centralized network, architecture in a distributed network structure.

If it powers on at step S610, the BS performs a booting process based on the information stored in the firmware at step S620. Depending on the network architecture, the BS that has a wired backhaul uses the wired backhaul, and the BS which does not have a wired backhaul may establish a wireless backhaul with the BS having the wired backhaul at step S630. Since the wireless backhaul can be established according to various technologies disclosed in the prior arts, detailed description thereof is omitted herein.

If a wireless backhaul is established so as to generate an interface for communication with the SON server, the BS is allocated a BS IP address for IP communication with the SON server at step S640. Unlike the case of the centralized network architecture using the private IP address, it may be necessary to allocate a public IP address to the BS for communication with the SON server connected to an external IP network in the distributed network architecture. Unlike the internal IP (private IP) address, static allocation of public IP addresses is inferior in view of IP address utilization, and this means that the static allocation of public IP addresses is very inefficient. In the embodiment of FIG. 6, it is assumed that the dynamic IP address allocation is used for allocating an IP address to the BS in the distributed network.

If an IP address is allocated, the BS performs the authentication procedure with the SON server at step S650 and, if the authentication is successful, downloads software and initial configuration data for normal BS operations from the SON server at step S660. Since the BS operating in the distributed network has a gateway function unlike the BS operating in the legacy centralized network, the initial configuration data is very large in volume. There is therefore a need of a method for processing the large initial configuration data effectively so as to operate efficiently in the distributed network.

Finally, the BS performs the initial radio resource configuration based on the initial configuration data at step S670 and enters the operation state allowing a terminal to connect at step S680.

Figure 7:
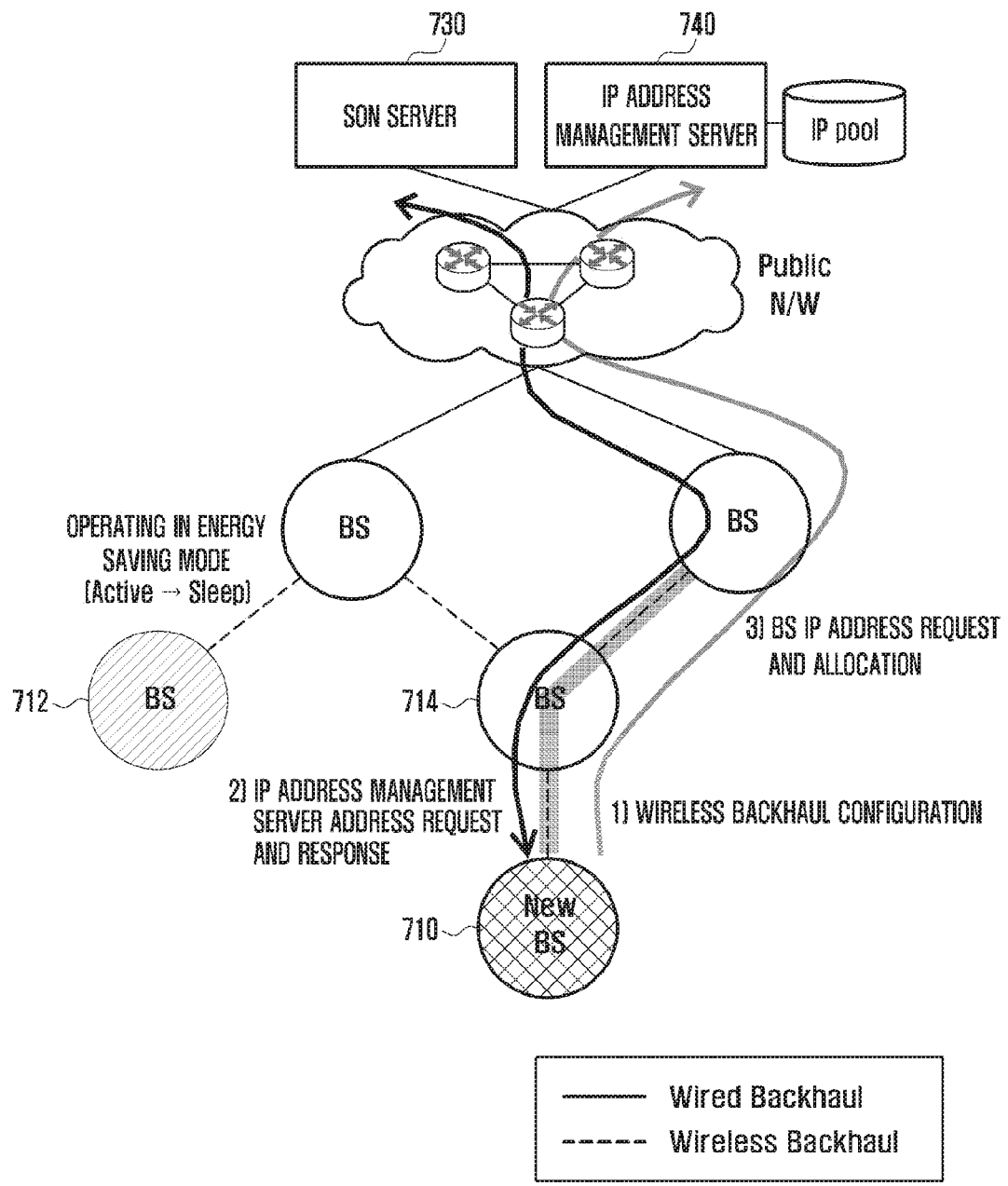
FIGS. 7 and 8 are diagrams illustrating exemplary distributed networks to which is applied the BS IP allocation method designed for the centralized network architecture.
Figure 8:
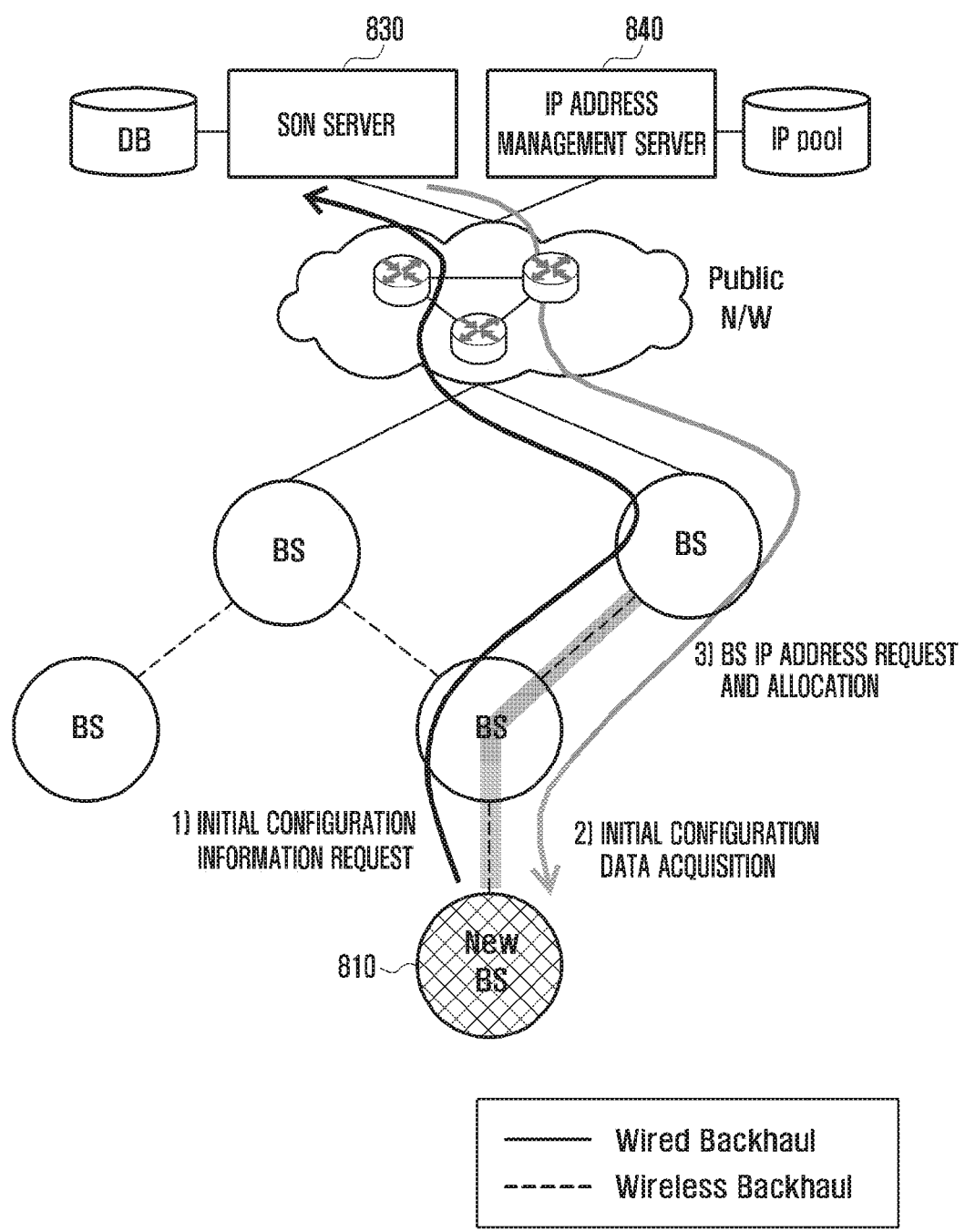

Applying the BS self-configuration method used in the centralized network to the distributed network as described with reference to FIG. 6 may cause two problems. These problems are described hereinafter with reference to FIGS. 7 and 8. FIGS. 7 and 8 are diagrams illustrating exemplary distributed networks to which is applied the BS IP allocation method designed for the centralized network architecture.

First, if the BS IP allocation method used in the centralized network is applied to the distributed network, this increases the IP allocation delay time and worsens the waste of public IP addresses.

In FIG. 7, it is assumed that a newly deployed BS has no wired backhaul. The newly deployed BS 710 may establish a wireless backhaul to communicate with the devices (e.g. IP address management server and SON server) located in an external IP network. If the wireless backhaul is established, the BS is allocated a public IP address from the IP address management server 740 located in the external IP network and communicates with the SON server 730 using the allocated public IP address.

At this time, the BSs 710, 712, and 714 which have no wired backhaul have to establish multi-hop wired/wireless backhauls for communication with the IP management server 740 and the SON server 730 located in the external network, and this retards communication. Furthermore, if the BS 712 has no terminal to serve for a long time after being allocated a public IP address, its operation state transitions from an active state to an idle state. Since the public IP address allocated to the BS operating in the idle state cannot be allocated to any other BS, this results in a waste of a public IP address. This problem is aggravated as the number of BSs increases for forming a large number of small cells Second, if the BS self-configuration method designed for the centralized network is applied to a distributed network, both the initial configuration data acquisition delay time and network load increase. If the BS initial data acquisition method designed for the centralized network architecture is applied to the distributed network architecture, a procedure as shown in FIG. 8 is required.

The newly deployed BS 810 requests to the SON server 830 for initial configuration data. In FIG. 8, it is assumed that the newly deployed BS 810 has no wired backhaul and thus establishes a multi-hop wireless backhaul to connect to the SON server 830. The BS acquires the initial configuration data from the SON server, performs initial wireless configuration based on the initial configuration data, and completes the self-configuration procedure to serve the terminals.

At this time, since the newly deployed BS 810 acquires all initial configuration data from the SON server, the initial booting time (loading time) increases because of data transfer through the multi-hop wired/wireless network. The initial booting time is used as a criterion for determining the BS capability as one of the Key Performance Indicators (KPI) which the operator takes into consideration for selecting network facilities. Since the large amount of the initial configuration data is received through a core network, the traffic load of the core network increases as the number of BSs that perform the self-configuration procedures increases. As a consequence, the initial booting time delay retards the service provisioning in view of the user, resulting in degradation of User Experience (UX).

An embodiment of the present invention proposes an improved BS IP address allocation method and an initial configuration data acquisition method optimized to the distributed network architecture. These methods may be more efficient in the small cell-based distributed network architecture.

An embodiment of the present invention is directed to a BS IP address allocation method and an initial configuration data acquisition method as parts of the BS self-configuration function for the small cell-based distributed network architecture. In the following description, the BS IP address allocation method is divided into an IP address allocation time optimization scheme and a dynamic IP Pool management scheme. Also, descriptions are made of the new logical device and related context information for supporting the schemes, IP Pool management procedure, and distributed initial configuration data acquisition procedure.

First, descriptions are made of the BS IP address allocation and IP Pool management method.

The BS may divide the allocated public IP Pool into a Global IP Pool and a Local IP Pool for hierarchical management to reduce the IP address allocation time. The Global IP Pool may be managed by the IP address management server as before, while the Local IP Pool may be managed by a Local IP Pool Manager (LIPM).

Figure 9:
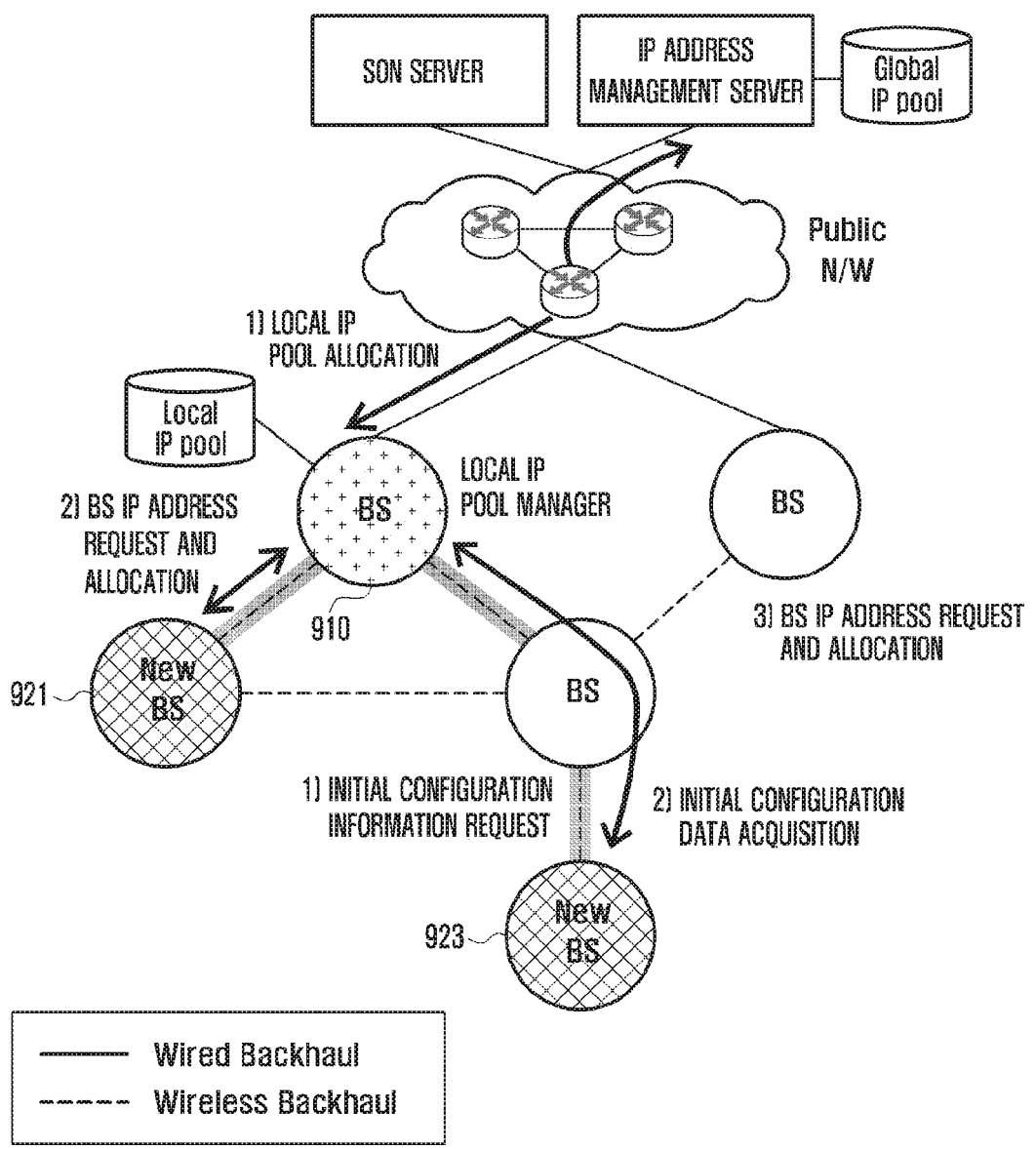
FIG. 9 is a diagram illustrating a hierarchical and distributed IP Pool allocation method for minimizing IP address allocation time.

FIG. 9 is a diagram illustrating a hierarchical and distributed IP Pool allocation method for minimizing IP address allocation time.

The LIPM requests to the IP address management server located in the external IP network for allocation of a predetermined size of IP Pool. At this time, the LIPM may be selected by the operator or among the BSs having the wired backhaul in the local network. In the embodiment of FIG. 9, the BS 910 is selected as LIPM.

The newly deployed BSs 921 and 923 may request to the LIPM for allocation of an IP address. According to the embodiment of FIG. 6, since the newly deployed BS is allocated an IP address from the IP address management server located in the external IP network, the IP address allocation is delayed. In the embodiment of FIG. 9, however, the IP address allocation delay may be reduced because the LIPM 910 is located in the local network.

Figure 10:
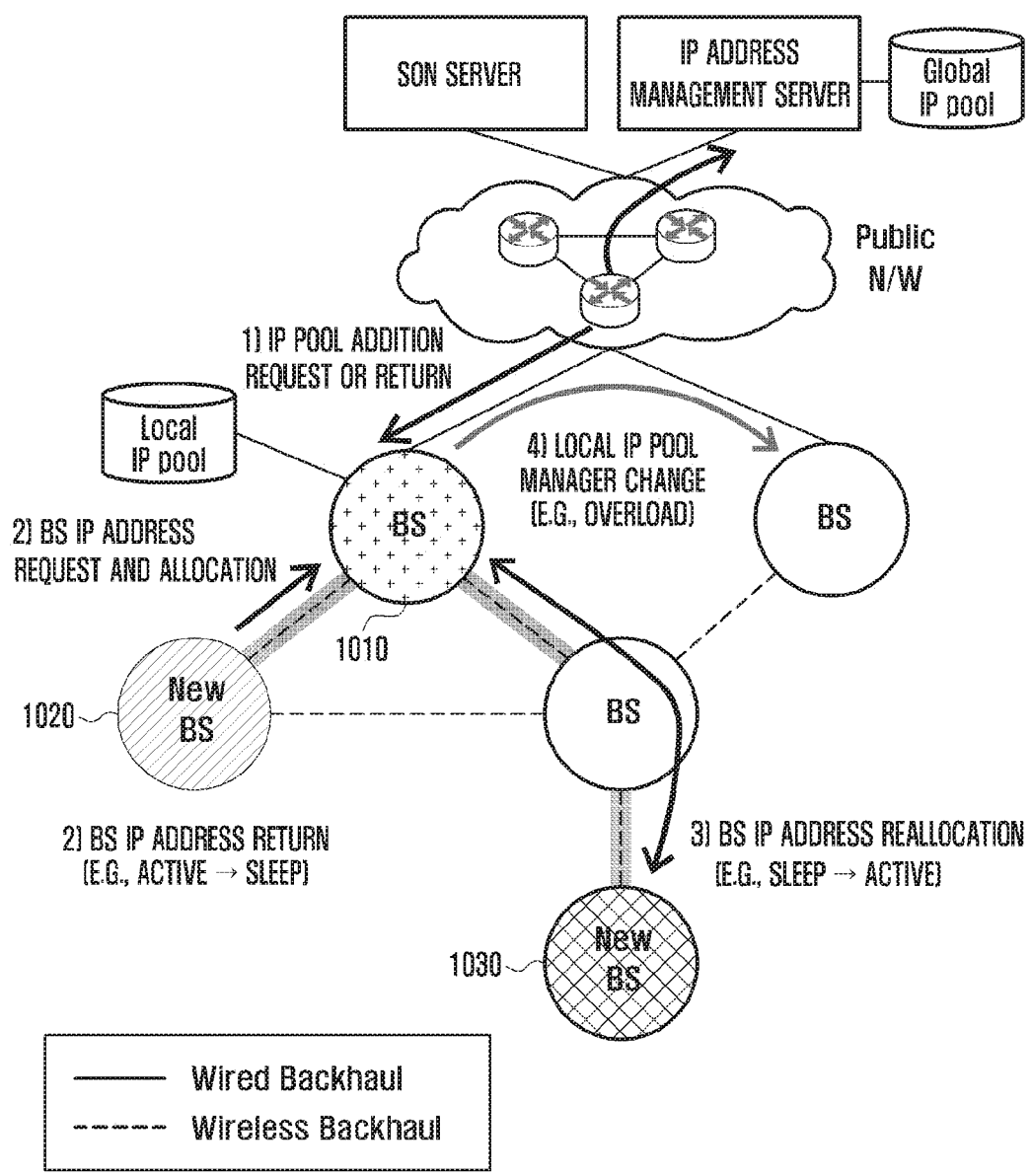
FIG. 10 is a diagram illustrating a dynamic IP management method according to an embodiment of the present invention.

FIG. 10 is a diagram illustrating a dynamic IP management method according to an embodiment of the present invention. In order to reduce waste of the restricted number of public IP resources, it may be possible to manage the IP Pool dynamically as shown in FIG. 10.

The LIPM 1010 may request to the IP address management server for additional IP Pool or withdrawal of the allocated IP Pool based on the usage level of the IP Pool, geographical location, and time information. For example, if its operation state transitions from the active state to the idle state, the BS 1020 may return the BS IP address to the LIPM 1010. Also, if its operation state transitions from the idle state to the active state, the BS 1030 is allocated a new IP address from the LIPM 1010. In the case that the LIPM 1010 is in the overload state, it may be possible to change the LIPM for a new LIPM for service continuity.

The IP Pool management method for managing the public IP resources efficiently may be divided into an initial IP Pool allocation procedure and an IP Pool change procedure during the operation. Descriptions are made of various embodiments for the IP address management server to allocate the IP Pool initially to the LIPM.

Method 1: It may be possible to allocate the IP Pool distinctly depending on the system capacity of the LIPM. For example, if the LIPM is a macro cell BS, the LIPM is allocated a large IP Pool in comparison with the case where the LIPM is a small cell BS.

Method 2: It may be possible to allocate the IP Pool based on statistical information. For example, the LIPM located in a hotspot area may be allocated a large IP Pool.

Method 3: It may be possible to allocate the IP Pool based on local information. The LIPM located in an urban area may be allocated a large IP Pool in comparison with the LIPM located in a rural area.

Method 4: It may be possible to allocate the IP Pool based on time information. The LIPM which operates during the night may be allocated a large IP Pool in comparison with the LIPM which operates during the day.

The procedure for the LIPM to manage the IP Pool dynamically during the operation adds or returns to the IP Pool based on the IP pool utilization and threshold as shown in equation (1).

$$U = \frac{\text{Allocated \# of } IP \text{ address}}{\text{Total \# of } IP \text{ address}} \quad (1)$$

If the value U of equation (1) is greater than the maximum utilization, IP Pool addition is requested; or otherwise, if the value U is less than the minimum utilization, IP Pool is returned.

The LIPM may store the IP Pool allocated by the IP address management server in a location storage in the form of a table such as Table 1. The table can be used for managing the total number of IP addresses allocated by the IP address management server, number and range of the IP addresses allocated to the BS, number and range of the unallocated IP addresses, IP Pool Utilization, addresses of SON server and IP address management server, and ID of the BS which uses the allocated IP address in the form of a list.

Descriptions are made of the procedures for managing the local IP Pool according to various embodiments of the present invention with reference to FIGS. 11 to 16.

Figure 11:
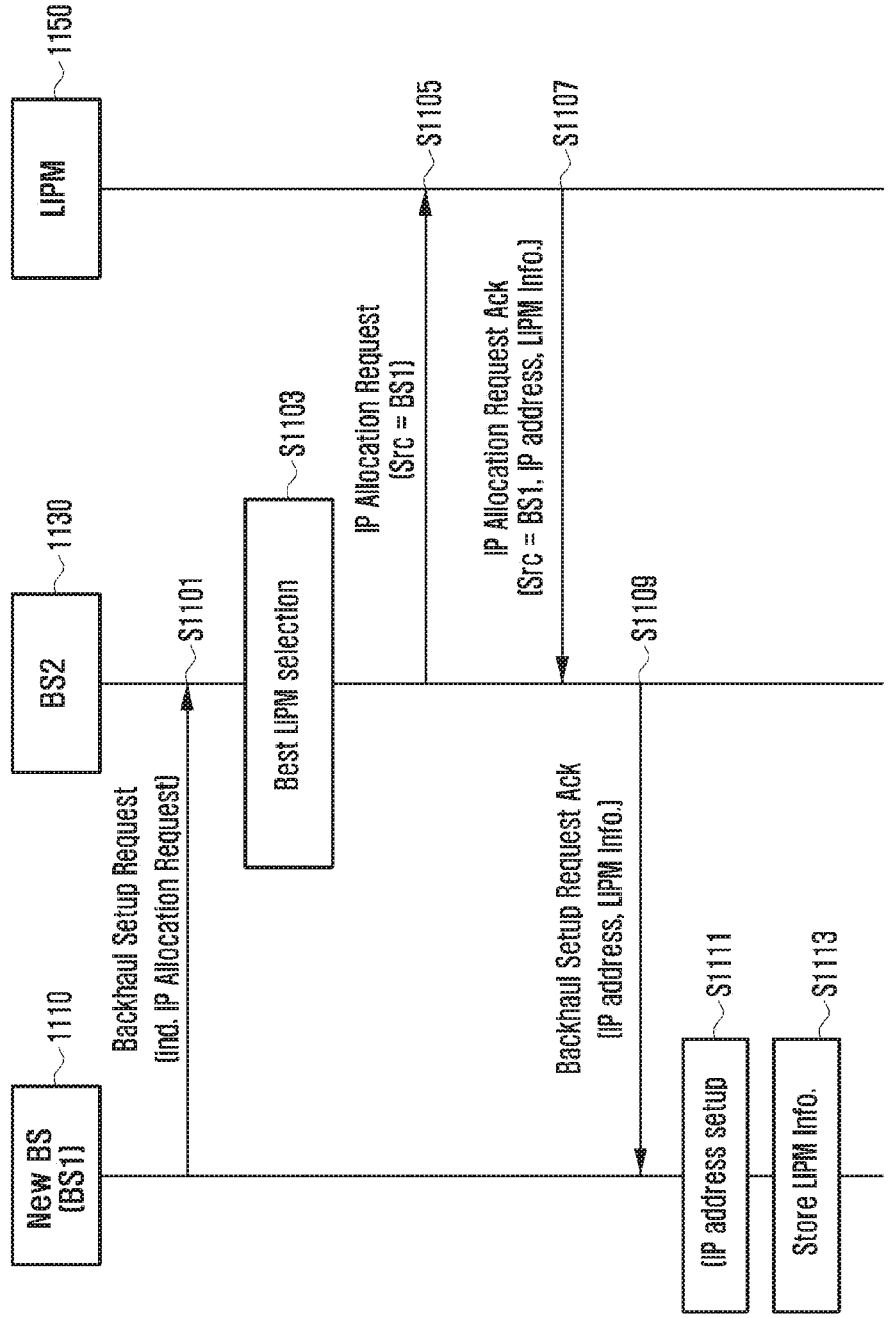
FIG. 11 is a signal flow diagram illustrating a procedure for allocating IP addresses through backhaul configuration, when a new BS is deployed, according to an embodiment of the present invention.

FIG. 11 is a signal flow diagram illustrating a procedure for allocating IP addresses through backhaul configuration when a new BS is deployed, according to an embodiment of the present invention. The new BS 1110 may send the neighboring BS 1130 a Backhaul Setup Request message including an IP address allocation request (IP Allocation Request) at step S1101. The neighboring BS 1130 may select an optimal LIPM at step S1103.

The neighboring BS 1130 transmits the IP address allocation request (IP Allocation Request) to the selected LIPM 1150 at step S1105, and the LIPM 1150 allocates an IP address corresponding to the IP address request message at step S1107.

The neighboring BS 1130 may send the new BS 1110 a Backhaul Setup Request ACK message at step S1109. The Backhaul Setup ACK message may include an IP address and LIPM Information (Info). The new BS 1110 may configure the IP address received from the neighboring BS 1130 at step S1111 and store the LIPM information in the local storage at step S1113.

Figure 12:
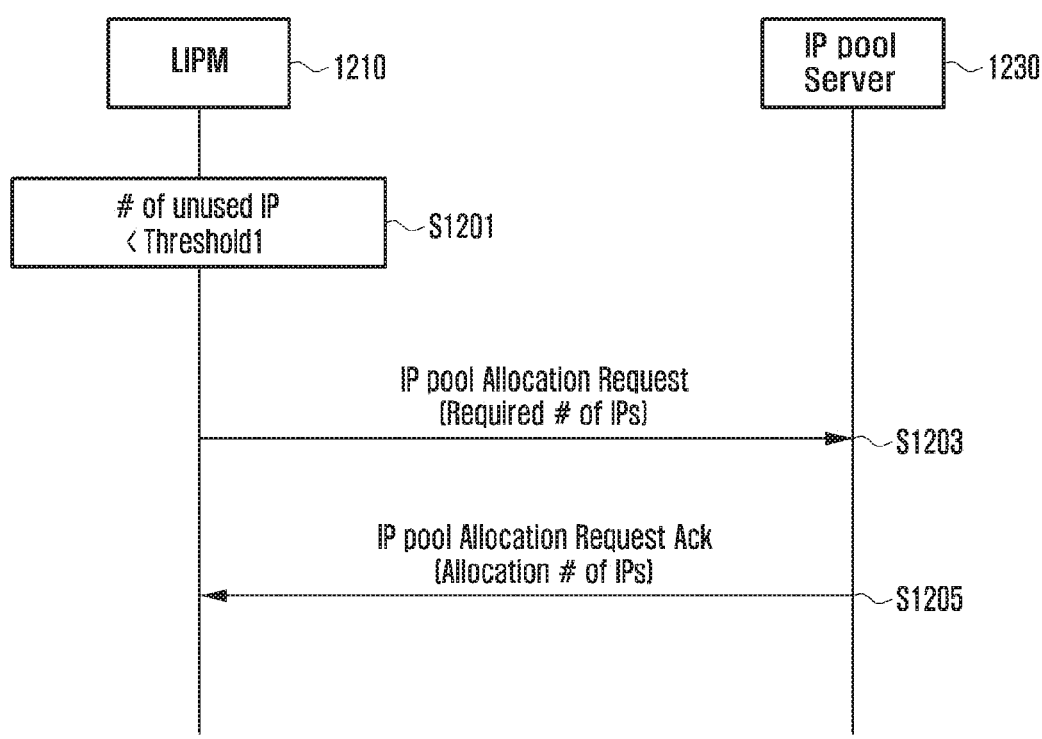
FIG. 12 is a signal flow diagram illustrating an IP Pool allocation request procedure of the LIPM according to an embodiment of the present invention.
Figure 13:
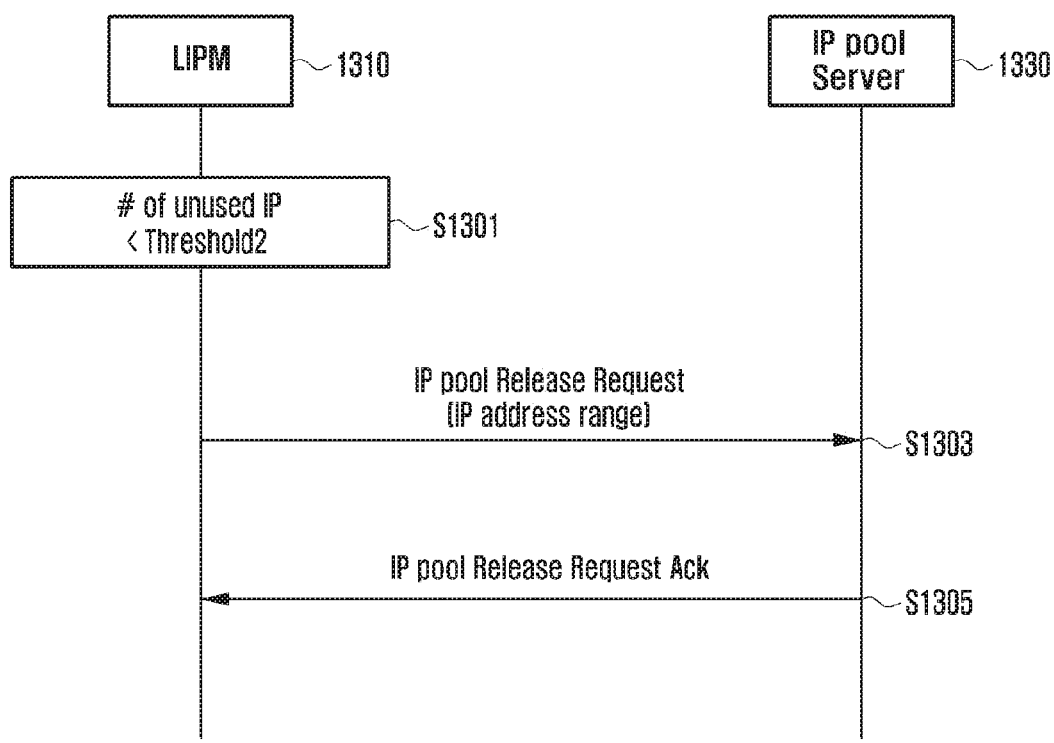
FIG. 13 is a signal flow diagram illustrating an IP Pool return procedure of the LIPM according to an embodiment of the present invention.

A description is made hereinafter of a procedure for the LIPM to be allocated or return an IP Pool with reference to FIGS. 12 and 13. FIG. 12 is a signal flow diagram illustrating an IP Pool allocation request procedure of the LIPM according to an embodiment of the present invention, and FIG. 13 is a signal flow diagram illustrating an IP Pool return procedure of the LIPM according to an embodiment of the present invention.

Referring to FIG. 12, the LIPM 1210 may compare the number of IP addresses which are allocated to the LIPM but not in use and a predetermined first threshold at step S1201. If the number of IP addresses allocated but not in use is less than the first threshold, it may be determined that the number of IP Pools allocated to the LIPM is running short.

TABLE 1

<Information stored in local storage of LIPM>

| Number of IP addresses | Number and range of allocated IP addresses | Number and range of unallocated IP addresses | IP Pool Utilization | Address of SON server/IP address management server | Connected BSs |
|---|---|---|---|---|---|
| 1000 | 5000 (210.xxx.xxx.xxx~210.yyy.yyy.yyy) | 500 (210.zzz.zzz.zzz~210.aaa.aaa.aaa) | 50% | 211.192.23.7 212.121.231.7 | BS1, BS2, BS3, ... |

The BS in the active state may store the LIPM information in the local storage in the form of a table such as Table 1. The BS in the active state may exchange information with the LIPM periodically or aperiodically to maintain the updated state and may support IP address allocation to new BSs or the BSs that awaken from the idle state while managing the LIPM information.

TABLE 2

<LIPM information stored in BS operating in active state>

| LIPM ID | LIPM IP address | LIPM distance (# of hops) | LIPM capacity (# of IP addresses) | LIPM state | Others |
|---|---|---|---|---|---|
| BS1 | 210.123.123.2 | 2-hop | 10,000 | Normal | |
| BS7 | 211.123.124.7 | 4-hop | 1,000 | Overload | |

If it is determined that the number of the allocated IP Pools is running short, the LIPM 1210 may send the IP Pool server 1230 an IP Pool Allocation Request at step S1203. If the IP Pool Allocation Request is received from the LIPM 1210, the IP Pool Server 1230 may send an IP Pool Allocation Request ACK in response to the IP Pool Allocation Request at step S1205. In this way, it may be possible to allocate the IP Pool to the LIPM of which the IP Pool is running short.

Referring to FIG. 13, the LIPM 1310 may compare the number of IP addresses which are allocated to the LIPM but not in use and a predetermined second threshold at step S1301. If the number of IP addresses allocated but not in use is greater than the second threshold, it may be determined that a large number of allocated IP Pools remain.

If it is determined that a large number of allocated IP Pools remain, the LIPM 1310 may send the IP Pool Server 1330 an IP Pool Release Request at step S1203. If the IP Pool Allocation Request is received from the LIPM 1310, the IP Pool Server 1330 may send an IP Pool Release Request ACK in response to the IP Pool Release Request at step S1305. In this way, it may be possible to manage the IP Pool dynamically by releasing the IP Pool allocated to the LIPM but not in use.

Figure 14:
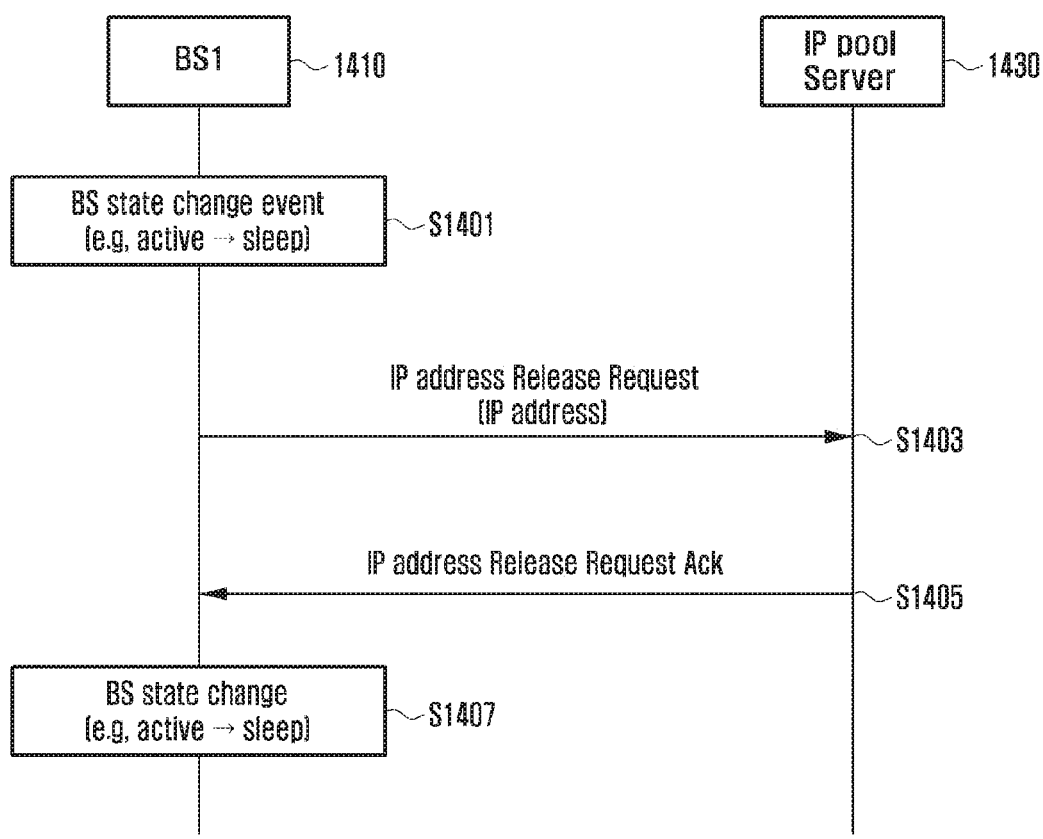
FIG. 14 is a signal flow diagram illustrating an IP address release procedure of a BS according to an embodiment of the present invention.
Figure 15:
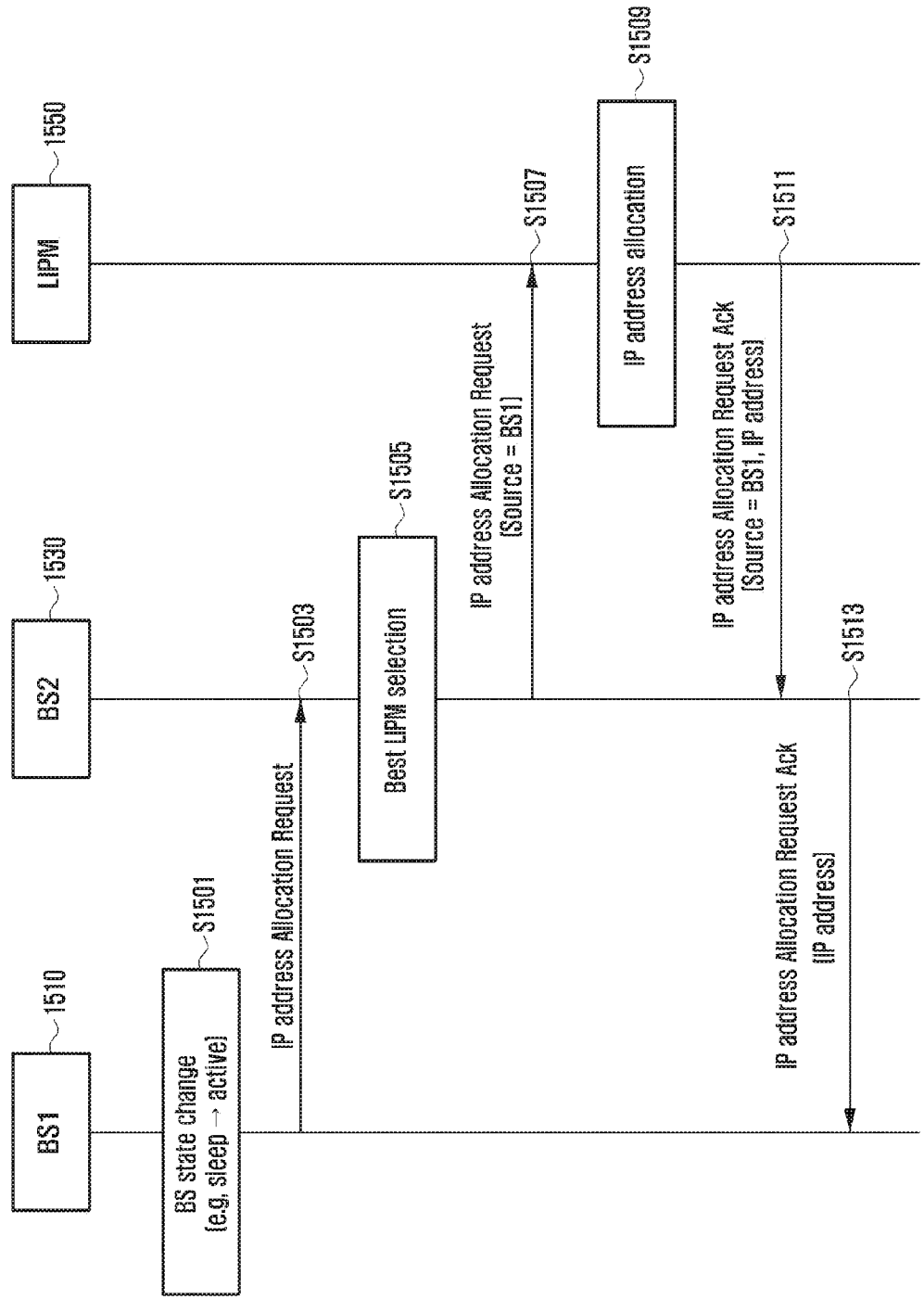
FIG. 15 is a signal flow diagram illustrating a procedure for allocating IP addresses via a neighboring BS according to an embodiment of the present invention.

A description is made hereinafter of the method for managing IP addresses depending on the state of the BS with reference to FIGS. 14 and 15. FIG. 14 is a signal flow diagram illustrating an IP address release procedure of a BS according to an embodiment of the present invention, and FIG. 15 is a signal flow diagram illustrating a procedure for allocating IP addresses via a neighboring BS according to an embodiment of the present invention.

Referring to FIG. 14, when the BS 1410 has no terminal to serve for a long time, an event transitioning from the active state to the idle state may occur at step S1401. If this event is detected, the BS 1410 may send the LIPM 1430 an IP Address Release Request message at step S1403. The LIPM 1430 may transmit an IP Address Release Request ACK in response to the IP Address Release Request at step S1405. If the IP Address Release Request ACK is received, the BS 1410 may release the IP addresses which it manages and transition to the idle state at step S1407.

A description is made hereinafter of the procedure for the BS 1510 to transition from the idle (sleep) state to the active state, request to the LIPM 1550 for an IP address via the neighboring BS 1530, and be allocated the IP address with reference to FIG. 15.

The BS 1510 may send the neighboring BS 1530 an IP Address Allocation Request message at step S1503. For example, when transitioning from the idle (or sleep) mode to the active mode at step S1501, the BS 1510 may make an IP Address Allocation Request at step S1503.

If the IP Address Allocation Request message is received from the BS 1510, the neighboring BS 1530 may select a best LIPM at step S1505. If the best LIPM has been selected already, it may be possible to omit step S1505 and use the selected LIPM. The neighboring BS 1530 may forward the IP Address Allocation Request message received from the BS 1510 to the selected LIPM 1550 at step S1507.

The LIPM 1550 may allocate an IP address in response to the IP Address Allocation Request at step S1509. The LIPM 1550 may transmit an IP Address Allocation Request ACK in response to the IP Address Allocation Request at step S1511. The LIPM 1550 may transmit the IP Address Allocation Request ACK to the neighboring BS. The IP Address Allocation Request ACK may include the IP address corresponding to the information on the BS which allocates the IP address.

The neighboring BS 1530 may forward the IP Address Allocation Request ACK received from the LIPM 1550 to the BS 1510 at step S1513. The neighboring BS 1530 may select the BS 1510 to which the IP address is delivered based on the BS information included in the IP Address Allocation Request ACK and transmit the IP address information corresponding to the selected BS.

Figure 16:
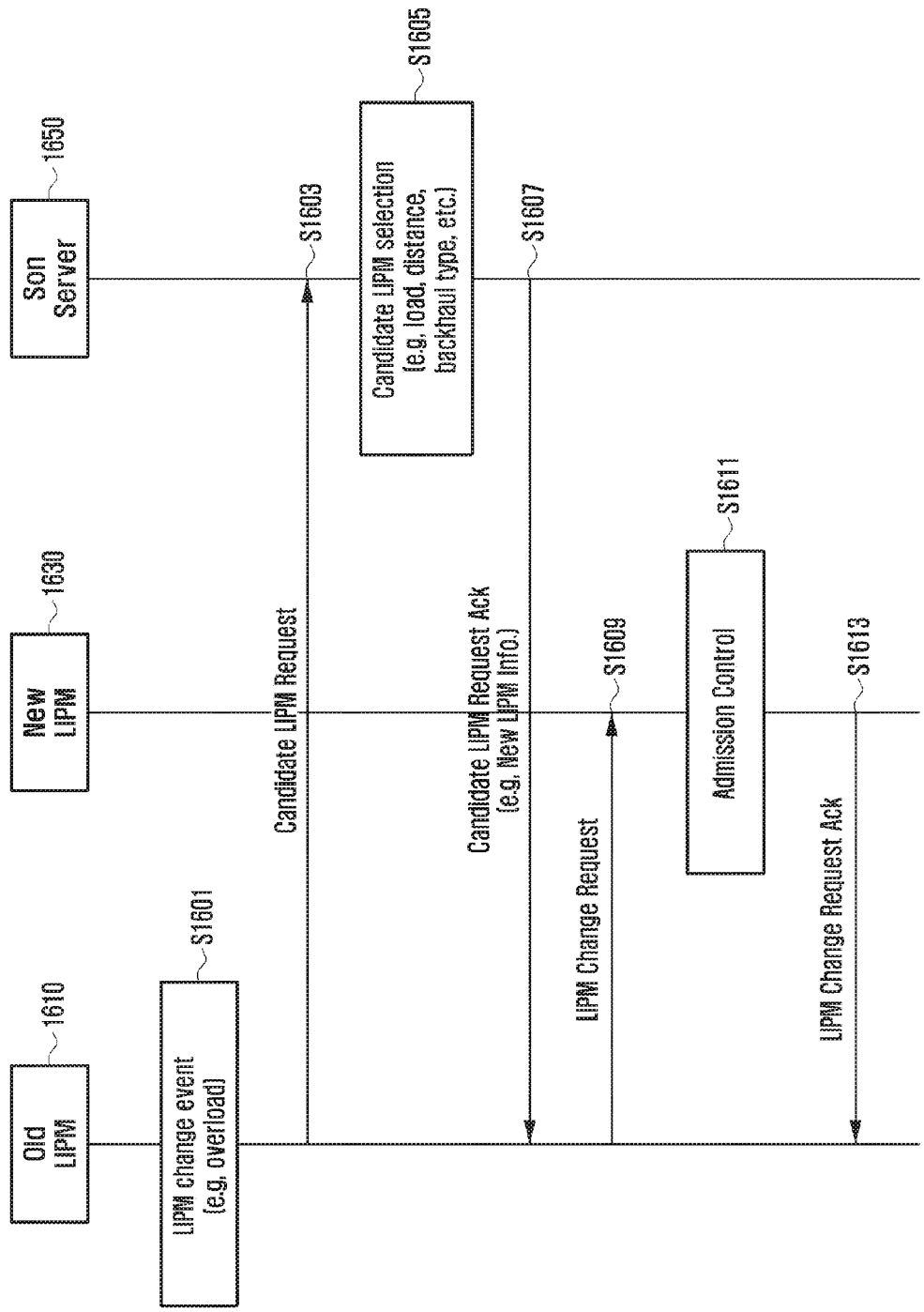
FIG. 16 is a signal flow diagram illustrating an LIPM selection method according to an embodiment of the present invention

A description is made hereinafter of the procedure for selecting a new LIPM when the current LIPM is under overload with reference to FIG. 16. FIG. 16 is a signal flow diagram illustrating a procedure for selecting a new LIPM, when the current LIPM is under overload, according to an embodiment of the present invention.

Referring to FIG. 16, if overload occurs at the LIPM 1610, the LIPM detects the overload state at step S1601. If the overload state is detected, the LIPM 1610 sends the SON server 1650 a Candidate LIPM Request message for a new LIPM at step S1603. If the Candidate LIPM Request message is received, the SON server 1650 may select at step S1605 the new LIPM 1630 in consideration of the load level, distance, and type of the backhaul.

The SON server 1650 may transmit at step S1607 the information on the newly selected LIPM to the old LIPM 1610 which has transmitted the Candidate LIPM Request message. If the new LIPM information is received, the old LIPM 1610 may send the new LIPM 1630 an LIPM Change Request message at step S1609.

The new LIPM 1630 may confirm the LIPM change in response to the LIPM Change Request message at step S1611. In the case that the SON server selects the LIPM, it may be possible to control such that the new LIPM always accepts the LIPM change request. The new LIPM 1630 may send at step S1613 the old LIPM 1610 an LIPM Change Request ACK in response to the LIPM Change Request message. If the LIPM Change Request ACK is received, the old LIPM 1610 may transfer its LIPM function to the new LIPM 1630. When transferring the function, the information listed in Table 1 is sent to the new LIPM 1630.

Descriptions are made hereinafter of the initial configuration data acquisition methods according to embodiments of the present invention with reference to FIGS. 17 to 23.

Figure 17:
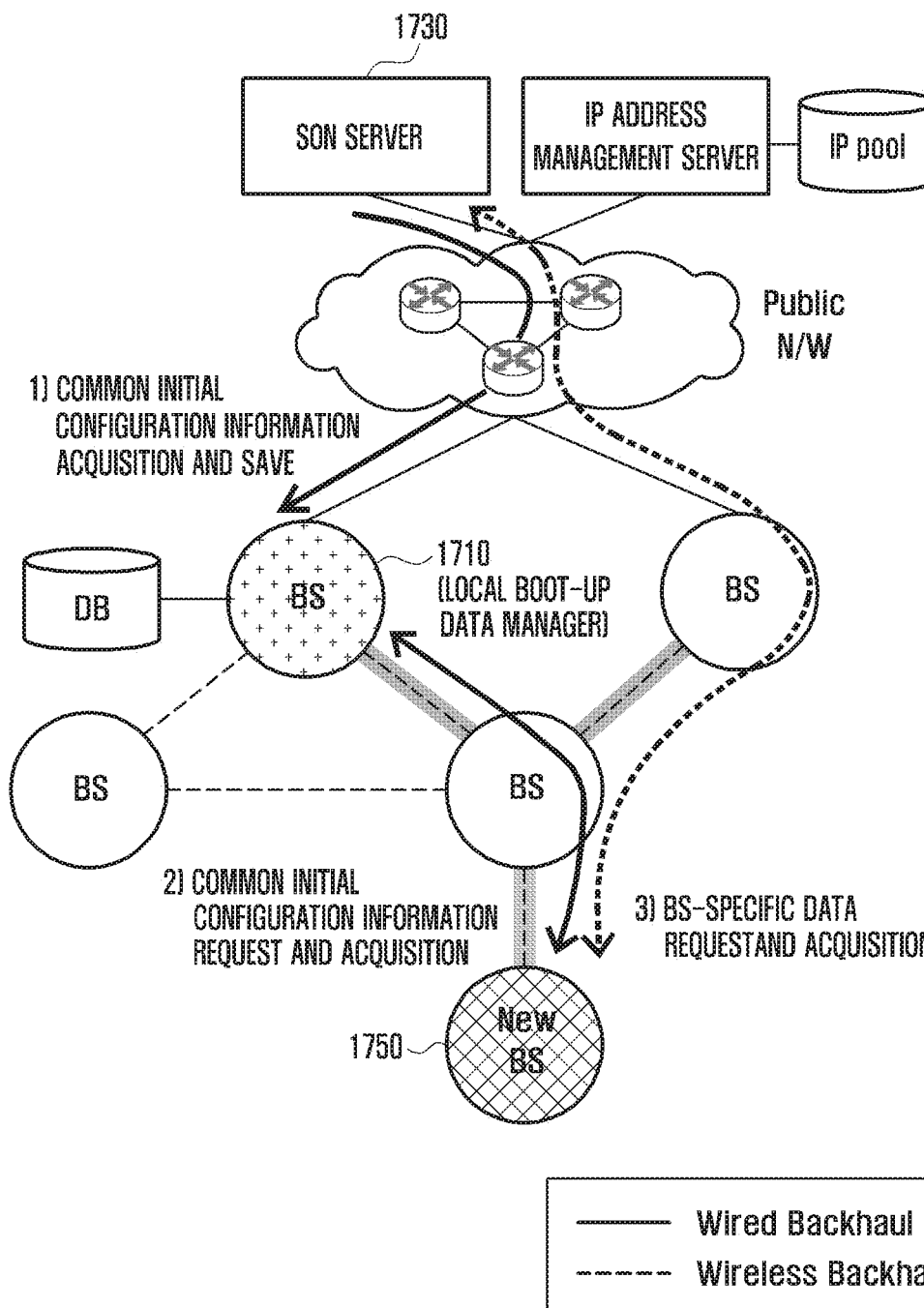
FIG. 17 is a diagram illustrating an initial configuration data acquisition method according to an embodiment of the present invention

FIG. 17 is a diagram illustrating an initial configuration data acquisition method according to an embodiment of the present invention. Referring to FIG. 17, a Local Boot-up Data Manager (LBDM) 1710 is deployed in the local network to acquire the common data from the SON server 1730 in advance. That is, if a new BS 1750 is deployed, it acquires common data large in volume from the LBDM 1710 located in the local network and the BS-specific data small in volume from the SON server 1730.

Since the proposed method is capable of acquiring the common data large in size and the BS-specific data small in size separately, it is possible to reduce the initial boot-up time of the new BS 1750 in comparison with the conventional technology. That is, the conventional technology acquires all of the BS initial configuration data from the SON server regardless of the type of data. However, the proposed method of FIG. 17 according to an embodiment of the present invention sorts the BS initial configuration data by type and acquires the data through the best routes and schemes for the respective data type so as to reduce the traffic amount passing through the core network and BS initial configuration time, thereby providing the user with the service promptly.

The newly deployed BS 1750 may search for the LBDM 1710 in the following manner. For example, it may be possible to acquire the information on the LBDM 1710 from the neighboring BS when configuring the inter-BS backhaul. It may also be possible to acquire the LBDM information by making an LBDM information request or broadcasting an LBDM discovery message.

Figure 18:
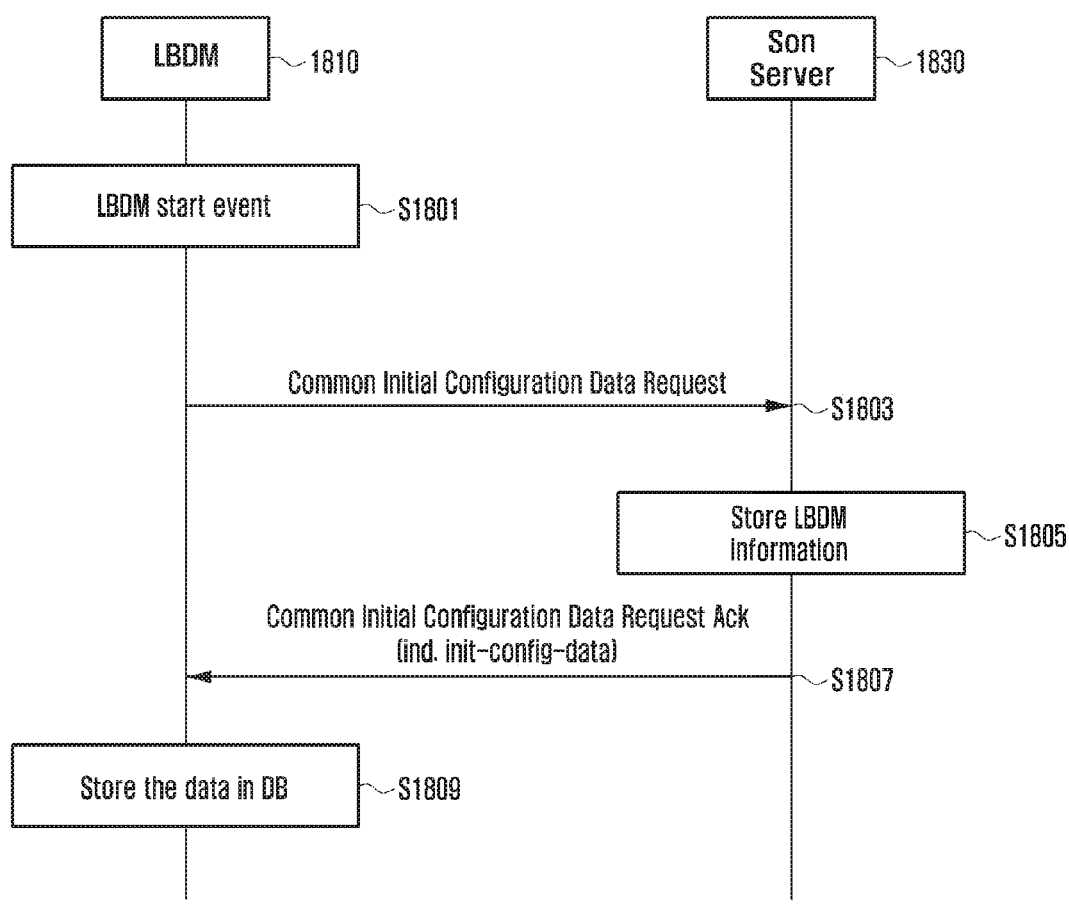
FIG. 18 is a signal flow diagram illustrating a procedure for an LBDM to acquire the common initial configuration information from an SON server according to an embodiment of the present invention.

FIG. 18 is a signal flow diagram illustrating a procedure for an LBDM to acquire the common initial configuration information from a SON server according to an embodiment of the present invention. Referring to FIG. 18, a start event may occur at the LBDM 1810 at step S1801. The LBDM 1810 may send the SON server 1830 a Common Configuration Data Request message at step S1803. The SON server 1830 stores the common initial configuration data information. The SON server 1830 may transmit a Common Initial Configuration Data Request ACK in response to the Common Initial Configuration Data Request at step S1807. The Common Initial Configuration Data Request ACK may include the common initial configuration data. The LBDM 1810 may store the common initial configuration data at step S1809.

Figure 19:
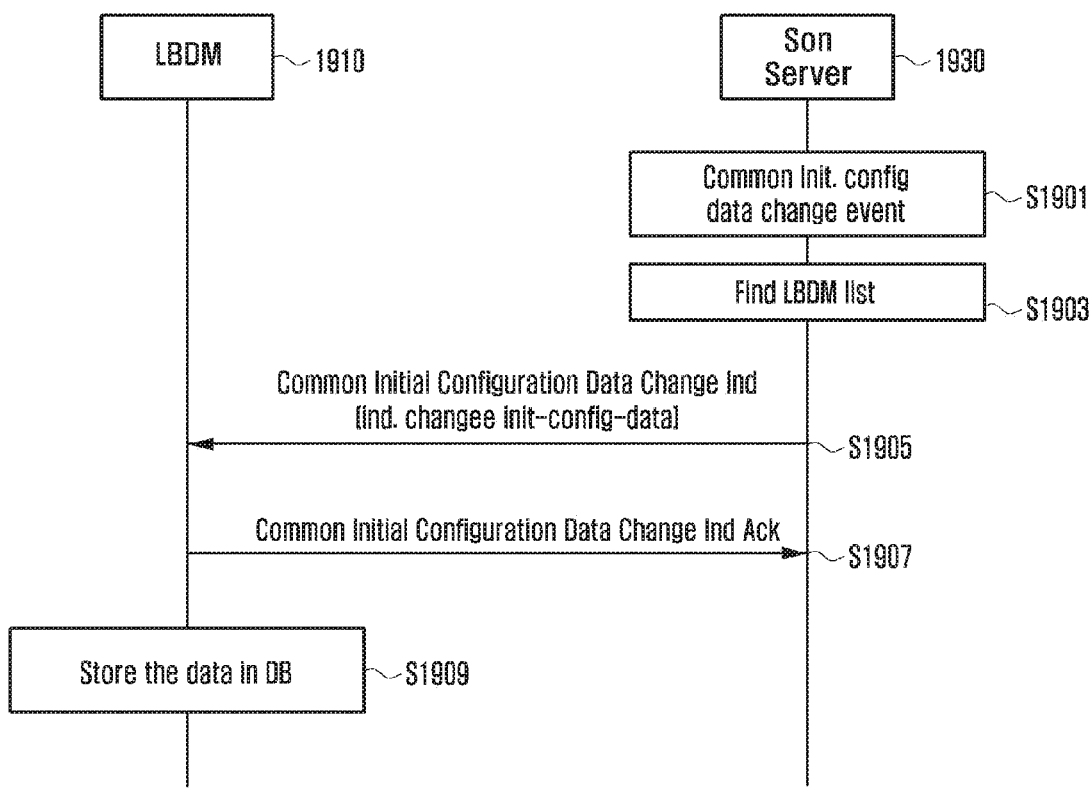
FIG. 19 is a signal flow diagram illustrating a common initial configuration data update procedure according to an embodiment of the present invention.

FIG. 19 is a signal flow diagram illustrating a common initial configuration data update procedure according to an embodiment of the present invention. Referring to FIG. 19, if the common initial configuration data are changed, the SON server may detect the change at step S1901. The SON server 1930 may search an LBDM list at step S1903. The LBDM list may be a list of the LBDMs having the initial configuration data to be updated based on the changed common initial configuration data.

The SON server 1930 may transmit a Common Initial Configuration Data Change Indication message at step S1905. This message may include the information on the changed common initial configuration data. The LBDM 1910 may send the SON server 1930 a Common Initial Configuration Data Change Indication ACK in response to Common Initial Configuration Data Change indication message at step S1907 and store the updated common initial configuration data at step S1909. If the common initial configuration data are changed as above, the SON server 1930 notifies the corresponding LBDM 1910 of the changed information to update the initial configuration data of the LBDM.

Figure 20:
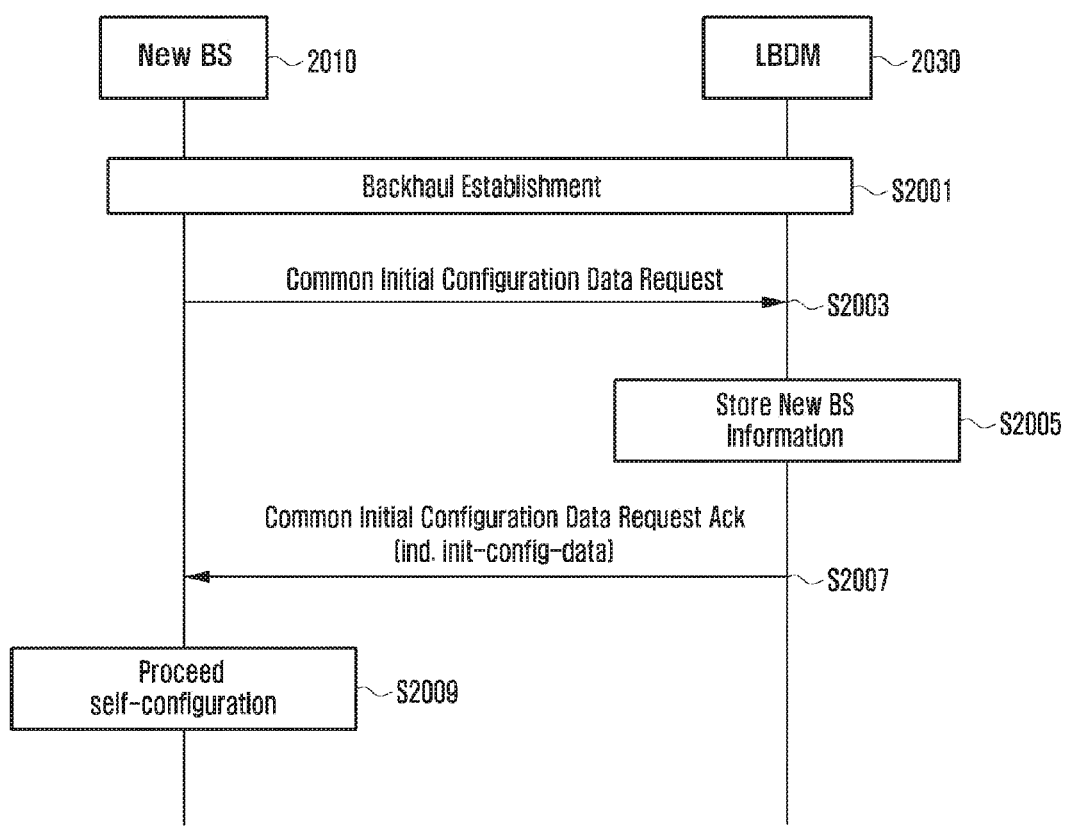
FIG. 20 is a signal flow diagram illustrating a common initial configuration data acquisition procedure of a BS according to an embodiment of the present invention.

FIG. 20 is a signal flow diagram illustrating a common initial configuration data acquisition procedure of a BS according to an embodiment of the present invention. Referring to FIG. 20, the newly deployed BS 2010 may establish a backhaul and request to the LBDM 2030 for common data. In detail, the new BS 2010 and the LBDM 2030 establish the backhaul at step S2001. The BS 2010 may transmit a Common Initial Data Request message at step S2003. The LBDM 2030 which stores the common initial configuration data may transmit the Common initial Configuration data in response to the request message at step S2007. If the initial configuration data are received, the BS 2010 may perform the self-configuration procedure using the received data at step S2009.

Figure 21:
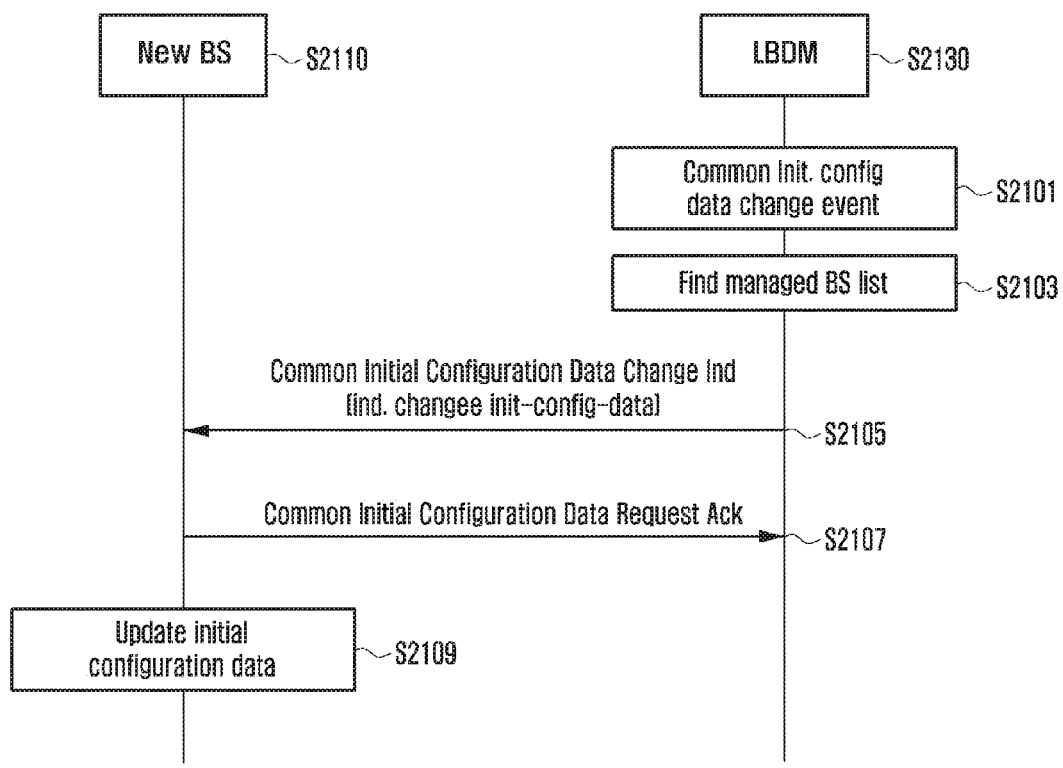
FIG. 21 is a signal flow diagram illustrating a common initial configuration data update procedure of a BS according to an embodiment of the present invention.

FIG. 21 is a signal flow diagram illustrating a common initial configuration data update procedure of a BS according to an embodiment of the present invention. If the common initial configuration data are changed, the LBDM may notify the BSs that have acquired the data from the LBDM of the change of the data and transmit the changed data.

If the common initial configuration data are changed at step S2101, the LBDM 2130 may detect the data change at step S2101. The LBDM 2130 may find a BS list under its management at step S2103. The BS list may be a list of the BSs requiring update of the initial configuration data according to the changed common initial configuration data.

The LBDM 2130 may send the found BS 2110 a Common Initial Configuration Data Change indication message at step S2105. This message may include the information on the changed Common Initial Configuration data. The BS 2110 may send the LBDM 2130 a Common Initial Configuration Data Change Indication ACK at step S2107 and update the common initial configuration data using the received information at step S2109. If the common initial configuration data is changed in this way, the SON server 1930 may notify the LBDM 1910 of the changed information to update the initial configuration data of the LBDM.

Figure 22:
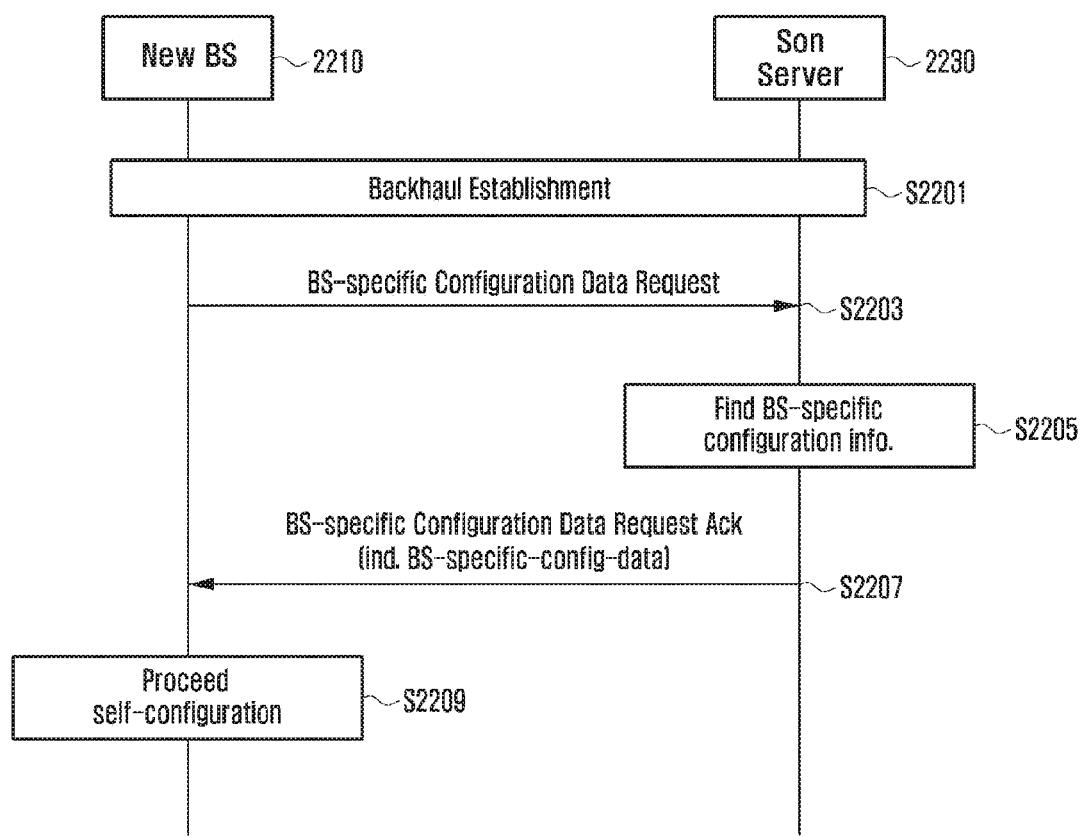
FIG. 22 is a signal flow diagram illustrating a BS-specific configuration information acquisition procedure according to an embodiment of the present invention.

FIG. 22 is a signal flow diagram illustrating a BS-specific configuration information acquisition procedure according to an embodiment of the present invention. Referring to FIG. 22, the new BS 2210 and the SON server 2230 may establish a backhaul at step S2201. The BS 2210 may request to the SON server 2230 for BS-specific configuration information concerning itself at step S2203. The SON server may retrieve the BS-specific configuration information corresponding to the received BS-specific configuration information request at step S2205. The SON server 2230 may send the corresponding BS 2210 the retrieved 13S-specific configuration information at step S2207. The BS 2210 may perform the self-configuration procedure based on the received information at step 2209.

Figure 23:
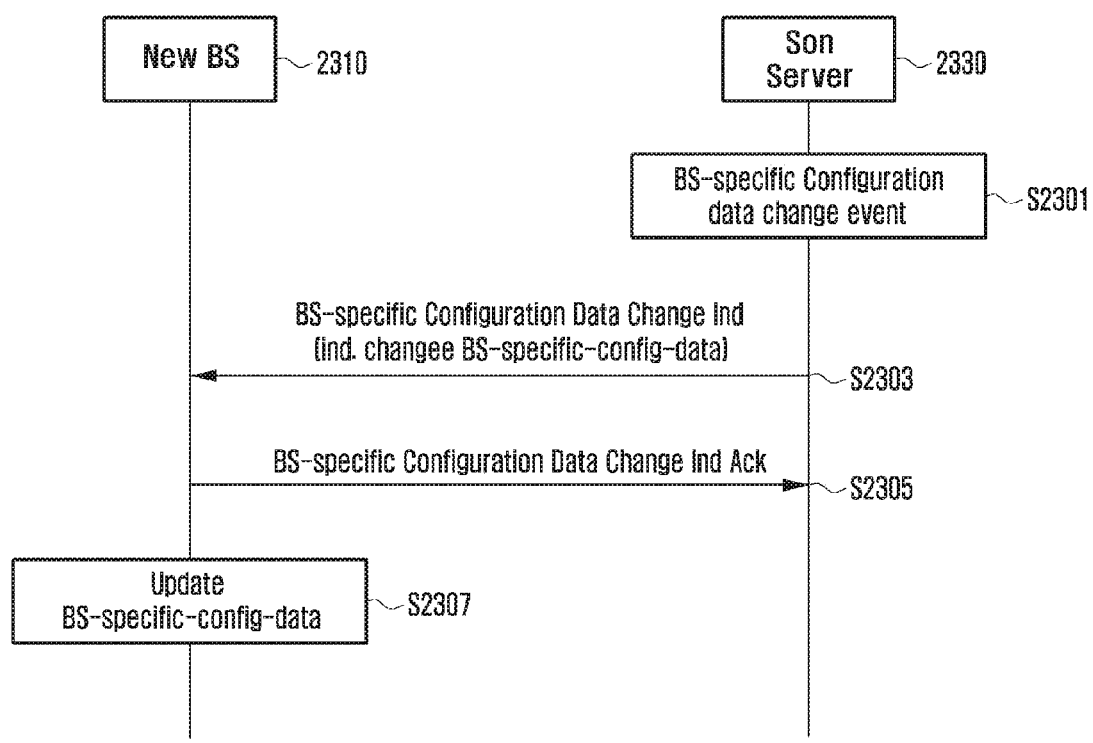
FIG. 23 is a signal flow diagram illustrating a BS-specific configuration information update procedure according to an embodiment of the present invention.

FIG. 23 is a signal flow diagram illustrating a BS-specific configuration information update procedure according to an embodiment of the present invention. Referring to FIG. 23, if the BS-specific configuration information is changed at step S2301, the SON server 2330 notifies the corresponding BS 2310 of the changed information at step S2303 such that the BS 2310 updates the BS-specific configuration information. If the update information is received, the corresponding BS 2310 transmits an acknowledgement message at step S2305 and updates the BS-specific configuration information using the received information at step S2307.

Figure 24:
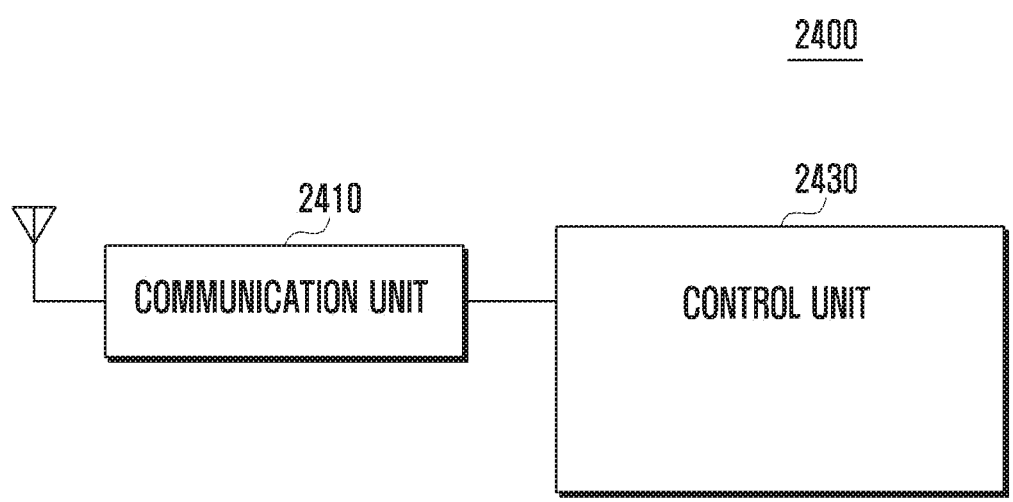
FIG. 24 is a block diagram illustrating a local manager according to an embodiment of the present invention.

FIG. 24 is a block diagram illustrating a local manager according to an embodiment of the present invention.

Referring to FIG. 24, the local manager 2400 according to an embodiment of the present invention may include a communication unit 2410 which is responsible for data communication and a control unit 2430 which is responsible for controlling overall operation of the local manager 2400. The local manager 2400 may be located in a local network including the LIPM and Local Boot-up Data Manager (LBDM).

In an embodiment of the present invention, the control unit 2430 may be allocated an IP Pool from an IP address management server of an external IP network and control receiving the IP address allocation request from a new BS located in the distributed network and allocating a temporary IP address to the BS based on the allocated IP Pool in response to the IP address allocation request.

The control unit 2430 may also control so as to be allocated an additional IP address from the IP address management server based on the IP address allocation ratio of the local manager or so as to return the IP address to the IP address management server.

The control unit 2430 may also control to withdraw, when the BS transitions to the idle state, the allocated IP address and to allocate, when the BS transitions to the active state, a certain IP address included in the IP Pool.

The control unit 2430 may also control to select a new local manager based on the load status of the local manager.

The control unit 2430 may also control to transmit to the BS the common data within the local network.

In the above description, the local manager 2400 includes a local IP Pool manager and a local boot-up data manager. However, it is not mandatory for the local manager to include the local IP Pool manager and the local boot-up data manager, but they may be implemented as separate components. It is obvious that the control unit 2430 can perform the self-configuration procedure as described with reference to FIGS. 2 to 23.

Figure 25:
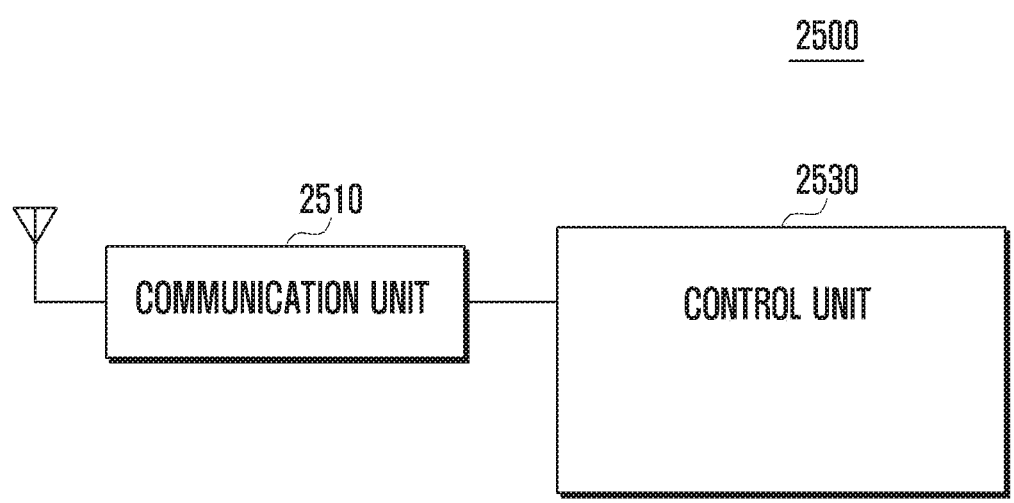
FIG. 25 is a block diagram illustrating a BS according to an embodiment of the present invention.

FIG. 25 is a block diagram illustrating a BS according to an embodiment of the present invention.

Referring to FIG. 25, the BS 2500 may include a communication unit 2510 which is responsible for data communication and a control unit 2530 which controls the overall operation of the BS 2500.

In an embodiment of the present invention, the control unit 2530 may control to transmit a backhaul configuration request message including IP address allocation information and receive a backhaul configuration response message including an IP address and local manager information.

The control unit 2530 may also control to return, when the BS transitions to the idle state, the allocated IP address. The control unit 2530 may also control to receive the common data of the local network from the local manager and BS-specific configuration information from the SON server.

It is obvious that the control unit 2530 can perform the BS self-configuration procedure as described with reference to FIGS. 2 to 23.

Although various embodiments of the present disclosure have been described using specific terms, the specification and drawings are to be regarded in an illustrative rather than a restrictive sense in order to help understand the present invention. Thus the scope of the invention should be determined by the appended claims and their legal equivalents rather than the specification, and various alterations and modifications within the definition and scope of the claims are included in the claims.

The invention claimed is:

1. A method of transmitting configuration information by a local manager in a distributed network architecture, the method comprising:
   transmitting a request for an Internet Protocol (IP) pool to an IP address management server of an external IP network;
   receiving, from the IP address management server, an IP pool among a plurality of IP pools, the plurality of IP pools being managed by the IP address management server;
   receiving an IP address allocation request from a base station in the distributed network; and
   allocating an IP address to the base station in response to the IP address allocation request, the IP address being selected from the IP pool.

2. The method of claim 1, wherein the local manager is a base station located in a local network having a wired backhaul established with the IP address management server.

3. The method of claim 1,
   wherein the method further comprising:
   managing the IP pool, and
   wherein the managing of the IP pool comprises:
      receiving an additional IP address from the IP address management server based on an IP address allocation ratio of the local manager, or
      returning the IP address to the IP address management server.

4. The method of claim 1,
   wherein the method further comprising:
   managing the IP address of the base station, and
   wherein the managing of the IP address of the base station comprises:
      withdrawing, when the base station transitions to an idle state, the allocated IP address, and
      allocating, when the base station transitions to an active state, an IP address included in the IP pool.

5. The method of claim 1, wherein the method further comprising selecting a new local manager based on load status of the local manager.

6. The method of claim 1,
   wherein the method further comprising:
   transmitting initial configuration data to the base station, and
   wherein the transmitting of the initial configuration data to the base station comprises:
      transmitting common data to base stations located within a local network.

7. A local manager of distributed network architecture, the local manager comprising:
   a transceiver configured to transmit and receive signals; and
   a controller coupled with the transceiver and configured to:
      control the transceiver to transmit a request for an Internet Protocol (IP) pool to an IP address management server of an external IP network,
      control the transceiver to receive, from the IP address management server, an IP pool among a plurality of IP pools, the plurality of IP pools being managed by the IP address management server,
      control the transceiver to receive an IP address allocation request from a base station in the distributed network, and
      allocate an IP address to the base station in response to the IP address allocation request, the IP address being selected from the IP pool.

8. The local manager of claim 7, wherein the local manager is a base station located within a local network having a wired backhaul established with the IP address management server.

9. The local manager of claim 7, wherein the controller is further configured to:
   manage the IP pool by:
      receiving an additional IP address from the IP address management server based on an IP address allocation ratio of the local manager, or
      returning the IP address to the IP address management server.

10. The local manager of claim 7, wherein the controller is further configured to:
   withdraw, when the base station transitions to an idle state, the allocated IP address, and
   allocate, when the base station transitions to an active state, an IP address included in the IP pool.

11. The local manager of claim 7, wherein the controller is further configured to select a new local manager based on load status of the local manager.

12. The local manager of claim 7, wherein the controller is further configured to:
   control the transceiver to transmit initial configuration data to the base station by transmitting common data to base stations located within a local network.

13. A base station of a distributed network, the base station comprises:
   a transceiver configured to transmit and receive signals; and
   a controller coupled with the transceiver and configured to:
      control the transceiver to transmit a backhaul configuration request message including Internet Protocol (IP) address allocation request information, and
      control the transceiver to receive a backhaul configuration response message including an IP address and information on a local manager,
   wherein the local manager receives an IP pool among a plurality of IP pools from an IP address management server of an external IP network, the plurality of IP pools being managed by the IP address management server.

14. The base station of claim 13, wherein the controller is further configured to return, when the base station transitions to an idle state, the allocated IP address.

15. The base station of claim 13, wherein the controller is further configured to control the transceiver to receive common data for base stations located within the local network from the local manager and base station-specific information from a self-organizing network (SON) server.

16. A method of configuring a backhaul by a base station of a distributed network, the method comprising:
- transmitting a backhaul configuration request message including Internet Protocol (IP) address allocation request information; and
- receiving a backhaul configuration response message including an IP address and information on a local manager,
- wherein the local manager receives an IP pool among a plurality of IP pools from an IP address management server of an external IP network, the plurality of IP pools being managed by the IP address management server.

17. The method of claim 16, wherein the method further comprises returning, when the base station transitions to an idle state, the allocated IP address.

18. The method of claim 16, wherein the method further comprises receiving common data for base stations located within the local network from the local manager and base station-specific information from a self-organizing network (SON) server.

* * * * *